US010946814B2

(12) United States Patent
Caruso et al.

(10) Patent No.: US 10,946,814 B2
(45) Date of Patent: Mar. 16, 2021

(54) MEDIUM DISTRIBUTION ASSEMBLY AND A VEHICLE DESIGN ELEMENT INCLUDING SUCH AN ASSEMBLY

(71) Applicant: MOTHERSON INNOVATIONS COMPANY LIMITED, London (GB)

(72) Inventors: Dean Caruso, Lonsdale (AU); Andreas Herrmann, Stuttgart (DE); Sam Thoday, Lonsdale (AU); Brad Gibson, Lonsdale (AU); Daniel Flynn, Lonsdale (AU); Simon Belcher, Lonsdale (AU)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 16/443,188

(22) Filed: Jun. 17, 2019

(65) Prior Publication Data

US 2019/0299880 A1    Oct. 3, 2019

Related U.S. Application Data

(63) Continuation-in-part of application No. 15/743,556, filed as application No. PCT/EP2016/066355 on Jul. 8, 2016, now Pat. No. 10,323,817.

(30) Foreign Application Priority Data

Jul. 10, 2015    (AU) ................. 2015902723

(51) Int. Cl.
*F21S 43/241*    (2018.01)
*F21S 43/14*    (2018.01)
(Continued)

(52) U.S. Cl.
CPC .............. *B60R 13/005* (2013.01); *B60Q 1/00* (2013.01); *B60Q 1/56* (2013.01); *B60S 1/487* (2013.01); *B60S 1/54* (2013.01); *B60S 1/60* (2013.01); *B60S 1/603* (2013.01); *G01S 7/4004* (2013.01); *G02B 6/006* (2013.01); *G02B 6/009* (2013.01); *G02B 6/0045* (2013.01);
(Continued)

(58) Field of Classification Search
CPC .......... F21S 43/241; F21S 43/14; F21S 43/30; F21S 43/26
See application file for complete search history.

(56) References Cited

U.S. PATENT DOCUMENTS

| 10,099,658 B1 | 10/2018 | Chupp | |
|---|---|---|---|
| 2006/0023468 A1 ‡ | 2/2006 | Takahashi | B60R 13/005 362/55 |
| 2014/0160778 A1 ‡ | 6/2014 | Nakada | G02B 6/002 362/51 |

FOREIGN PATENT DOCUMENTS

| CN | 205261400 U | 5/1916 |
|---|---|---|
| CN | 201484317 U ‡ | 5/2010 |

(Continued)

OTHER PUBLICATIONS

International Search Report dated Oct. 5, 2016 of International application No. PCT/EP2016/066355.
(Continued)

*Primary Examiner* — Joseph L Williams
(74) *Attorney, Agent, or Firm* — Jones Day

(57) ABSTRACT

A medium distributing assembly for a vehicle design element includes a medium guide including at least one medium receiving element; and at least one medium exit element, where the medium exit element has at least partly an annular form.

35 Claims, 15 Drawing Sheets

(51) Int. Cl.
  *F21S 43/40*   (2018.01)
  *B60R 13/00*   (2006.01)
  *F21V 8/00*    (2006.01)
  *G02B 27/00*   (2006.01)
  *B60Q 1/00*    (2006.01)
  *B60S 1/48*    (2006.01)
  *B60S 1/54*    (2006.01)
  *B60S 1/60*    (2006.01)
  *B60Q 1/56*    (2006.01)
  *G01S 7/40*    (2006.01)
  *H01Q 1/32*    (2006.01)
  *H01Q 1/42*    (2006.01)

(52) U.S. Cl.
  CPC ....... *G02B 6/0055* (2013.01); *G02B 27/0006* (2013.01); *H01Q 1/3233* (2013.01); *H01Q 1/42* (2013.01); *G01S 2007/4043* (2013.01); *G02B 6/0041* (2013.01)

(56) References Cited

FOREIGN PATENT DOCUMENTS

| | | |
|---|---|---|
| CN | 201599656 U ‡ | 10/2010 |
| DE | 10330526 A1 | 1/2005 |
| DE | 102012018782 A1 ‡ | 3/2013 |
| EP | 1911630 A1 ‡ | 4/2008 |
| JP | 2009-12558 A ‡ | 1/2009 |
| JP | 2011-63169 A ‡ | 3/2011 |
| WO | WO 00/062938 A1 | 10/2000 |
| WO | WO 2014/123939 A1 ‡ | 8/2014 |

OTHER PUBLICATIONS

Extended European Search Report dated Nov. 10, 2020 of European application No. 20180614.8-1012.

‡ imported from a related application

MEDIUM DISTRIBUTION ASSEMBLY AND A VEHICLE DESIGN ELEMENT INCLUDING SUCH AN ASSEMBLY

CROSS-REFERENCE TO RELATED APPLICATION

This application is a continuation-in-part of U.S. patent application Ser. No. 15/743,556, which is a national stage entry of International Patent Application No. PCT/EP2016/066355, filed Jul. 8, 2016, which claims the benefit of foreign priority to Australian Patent Application No. AU 2015902723, filed Jul. 10, 2015, each of which is incorporated by reference herein in its entirety for all purposes.

BACKGROUND

1. Field of the Invention

The present disclosure relates to a medium distributing assembly for a vehicle design element, selected from vehicle emblems, badges, logos and the like, which can provide a uniform medium output. In particular the present invention refers to a medium distributing assembly for a vehicle design element, the assembly including: a medium guide the medium guide including at least one medium receiving element and at least one medium exit element, wherein the medium exit element has an at least partly annular form.

2. Related Art

According to one aspect, the invention is directed to a light assembly which can provide a uniform light output without the use of light guide optic features and without the light source being viewable. Specifically it refers to a light guide, the light guide including a plurality of light receiving surfaces, and a plurality of light sources, preferably in form of light emitting diodes (LEDs) on a circuit board, the light sources being arranged adjacent to and directed towards respective light receiving surfaces.

An aesthetic feature which has become desirable in automotive applications is to provide exterior badges and emblems on vehicles which feature backlighting of key features of the particular badge or emblem. Many automotive badges have an overall circular profile or feature large annular elements, and it is desirable that this annularity is able to be backlit with an even (uniform or homogenous) luminance using light emitting diodes (LEDs) input. An LED is a directional light source having a relative luminous intensity that decreases as the viewing angle is increased. This may result in the appearance of bright or hot spots to an external viewer of the badge.

Lighting systems that provide a uniform luminous intensity are known, for example systems using expensive organic light emitting diode (OLED) technology or complex lens and reflector arrangements. Highly diffusing materials are also used but these have the drawback of giving a milky or hazy appearance and have poor optical efficiency. Optic features may also be used on clear materials to diffuse light, but these have the drawback that the optic features are visible in the unlit state which is undesirable. A further desirable feature is that the LED input is not directly visible to the external viewer of the badge.

According to a second aspect, the invention is directed to a fluid distributing assembly for a vehicle design element. The automotive industry is experiencing an increase in technology penetration, which will dynamically impact the automotive radar market in the future. The number of electromagnetic wave emitting and receiving devices in vehicles is significantly increasing, driven by increased safety and vehicle autonomy requirements. Especially radar systems using electromagnetic radiation with bandwidths of 24 GHz and 77 GHz, preferably located at the front of the vehicle, are used for the control of various systems such as autonomous cruise control. To increase the outer appearance of the vehicle, such radar system are often located behind vehicle design elements such as the car emblem. The design element acts in these configurations as so called radome.

Contaminations on a surface of such a radome like dust, dirt, snow, ice etc. leads to the problem that the function of the safety critical drive assistance system located at least partly behind the radome, especially of a radar system, cannot be ensured at all times. These impurities can occlude radar sensors, reduce accuracy and the reliability of information provided by the system. Overall, such impurities can have an impact on the safe manoeuvring of the vehicle.

SUMMARY

In one aspect, a light guide is shaped to define an annular base lying in a first plane and at least one circumferential flange or cylinder disposed generally orthogonal, or inwardly or outwardly splayed to the first plane, the flange or cylinder extending away from the annular base towards a viewable annular light exit, and the base including a plurality of shaped dements, in particular in form of disconnections, recesses, holes or wedge-shaped protrusions, extending away from the first plane, each shaped element defining one of the light receiving surfaces for receiving incident light from a respective adjacent light source, wherein a plurality of the light receiving surfaces are orientated substantially transverse to the base.

It is proposed that the light guide transitions from the base to the flange or cylinder, sharply with a radius of less than 10% of a height of the flange or cylinder, the sharp transition facilitating internal reflection of light emitted from the light sources.

Some embodiments of the invention are characterized in that the light guide is shaped to include two spaced-apart circumferential flange, each flange extending away from the annular base towards a viewable annular light exit, the two viewable annular light exits radially spaced apart from each other.

The light guide of other embodiments can be shaped to include two spaced apart circumferential cylinders, each cylinder extending away from the annular base towards a viewable annular light exit, the two viewable light exits radially spaced apart from each other.

The circumferential flanges or cylinders can be non-continuous to provide disconnections such that circumferential light entry points at disconnected surfaces on the circumference of the flanges or cylinders are provided.

It is preferred that the annular light exit includes a plurality of steps, the steps promoting internal reflection.

With the invention it is proposed that the light guide is substantially transparent and without any visible discrete optic features in an un-lit state, while being diffusive in a lit state. But the light guide annulus can also be substantially transparent and non-diffusive in both a lit and un-lit state, while the circumferential flanges or cylinders are substantially transparent in an un-lit state, while being diffusive in a lit state.

With the invention it is further proposed that a housing is provided behind the light guide, which preferably incorporates transitional reflective optics that vary the amount of light reflected back into the circumferential flanges or cylinders and/or comprises a black material.

The light guide can also feature a bridging member, manufactured from the same material as the light guide, which is located inside and bisects the substantially annular shape of the light guide, and the bridging member has first and second ends which are disposed as light receiving surfaces and a light emitting surface along its major surface.

The bridging member can have a substantially trapezoidal cross-section.

It is preferred that the printed circuit board has an annular shape and/or is coated white around the plurality of LEDs.

The printed circuit board can include additional light sources positioned adjacent to the light receiving surfaces to direct light into the bridging member.

It is proposed that the bridging member is used in conjunction with a garnish, the garnish preferably comprising cut-outs in the form of lettering or a logo.

The invention also proposes that the lens has an outer component, preferably made from a clear material, and an inner component, preferably over moulded on the inner surface of the outer component and/or made from opaque material.

It is further proposed that the inner or outer component joins to the housing and/or the inner component sits on top of the printed circuit board and the shaped elements.

The before described object is solved for the second aspect in that the medium is a, and/or comprises at least one preferably heated fluid, especially a cleaning fluid, preferably a cleaning gas and/or a cleaning liquid.

It is especially preferred that the medium receiving element is connected to at least one fluid reservoir, especially at least one holding tank and/or storing at least partly the medium.

The before described embodiments can be characterized in that the medium exit element comprises at least one nozzle, especially spray nozzle, wherein especially the fluid is directed, especially sprayed, onto at least one first surface of the design element, especially a first surface of the design element being adverted to at least one antenna emitting and/or sensing electromagnetic radiation in at least one first frequency band.

For the before described embodiment is preferred that the antenna is and/or comprises at least one radar antenna and/or the first frequency band is and/or comprises at least one radar frequency, especially 10 MHz to 130 GHz, preferably 20 GHz to 100 GHz, more preferred 20 Ghz to 30 GHz, 70 GHz to 80 GHz and/or 90 GHz to 100 GHz, most preferably 24 GHz, 77 GHz or 93 GHz.

For the two before described embodiments it is proposed that the design element is at least partially transmissible for electromagnetic radiation and comprises at least one first area being transmissible for electromagnetic radiation of at least the first frequency band, and being reflective, semitransparent and/or opaque for electromagnetic radiation falling onto the first surface and having a frequency within at least one second frequency band, wherein the second frequency band preferably comprises 384 THz to 789 THz and/or visual light.

An assembly according to the invention might be characterized in that the assembly comprises at least one sensing element for detection of contaminations on the first surface, especially rain, dust, dirt, snow, and/or ice.

For the before described embodiment it is preferred that the sensing element comprises at least one optical sensor, at least one ultrasonic sensor, at least one camera, at least one capacitive sensor, at least one magnetic sensor, at least one electromagnetic sensor and/or at least one conductibility sensor.

It is also proposed that the assembly comprises at least one control element for controlling and/or regulating a flow of the medium into the medium receiving element, through the medium guide and/or out of the exit element, especially based on signals of the sensing element.

Furthermore it is proposed that the sensing element is at least indirectly in communication with the control element and/or at least one drive assistance system of the vehicle, especially a lane holding assistant, an object detection assistant, a parking assistant and/or a rear viewing assistant.

For the assembly it is also preferred that the sensing element is sensing contaminations of the first surface in a direction being mainly parallel to a normal direction of the first surface.

Advantageous embodiments of the assembly might be characterized in that the sensing element is at least partly located in the first area on the side of the design element facing the antenna, wherein the first area is semitransparent and/or transmissible for third radiation, especially electromagnetic radiation within a third frequency band, detected by the sensing element and/or comprises at least one second area being semitransparent and/or transmissible for the third radiation.

For the before described embodiment it is preferred that the design element comprises at least one substrate being transmissible for electromagnetic radiation and at least one first coating covering the substrate in the first area, the first coating being transmissible for electromagnetic radiation of the first frequency band and semitransparent, reflective and/or opaque for electromagnetic radiation having a frequency the second frequency band.

For this embodiment it is proposed that the second area is free of the first coating and/or comprises at least one second coating covering the substrate in the second area and being semitransparent and/or transmissible for the third radiation.

Further advantageous embodiments can be characterized in that the sensing element is sensing contaminations of the first surface in a direction being mainly perpendicular to a normal direction of the first surface and/or parallel to the first surface.

It is furthermore preferred that the medium guide, the medium receiving element, the medium exit element and/or the sensing element is/are at least partly located behind at least one bezel of the design element.

Also the assembly might be characterized in that the bezel is at least partly opaque for the first radiation and/or second radiation and/or transparent and/or semitransparent for the third radiation.

The invention also provides a vehicle design element including and/or being connected to at least one medium distributing assembly, especially light assembly.

The element might be characterized in that the element is comprised at least partly by at least one radome and/or forms at least partly at least one radome.

Finally it is proposed for the element that the medium exit element is at least partly located on a side of the radome being located opposite the antenna.

According to a first aspect of the present invention, there is provided a vehicle design element including a light assembly, the assembly including a light guide, the light guide including a plurality of light receiving surfaces, a plurality of light emitting diodes (LEDs), the LEDs adjacent to and directed towards respective light receiving surfaces, characterized in that the light guide is shaped to define an annular base lying in a first plane and at least one circumferential flange disposed generally orthogonal to the first plane, the flange extending away from the annular base towards a viewable annular light exit, the base including a plurality of wedge-shaped protrusions extending away from the first plane, each protrusion defining one of the light receiving surfaces for receiving incident light from a respective adjacent LED, wherein a plurality of the light receiving surfaces are orientated substantially transverse to the base.

In one form, the wedge shaped protrusions are replaced by recesses or holes in the annular base.

In one form, the light guide transitions from the base to the flange sharply with a radius of less than 10% of the height of the flange, the sharp transition facilitating internal reflection of light emitted from the LEDs.

In one form, the light guide is shaped to include two spaced-apart circumferential flanges, each flange extending away from the annular base towards a viewable annular light exit, the two viewable annular light exits radially spaced apart from each other.

In one form, the annular light exits include a plurality of steps, the steps promoting internal reflection.

In one form, the light guide is substantially transparent and without any visible discrete optic features in an un-lit state, while being diffusive in a lit state.

In one form, the housing behind the light guide is shaped to promote reflection of light back into the circumferential flange or cylinder In one form the light guide flange is substantially transparent and non-diffusive in a lit and unlit state and the circumferential flange or cylinder is substantially transparent in an unlit state, whilst being diffusive in a lit state.

In one form the circumferential flange is replaced by at least one circumferential cylinder, the transition between the annular base and the circumferential cylinder, facilitating internal reflection of light emitted from the LED's efficiently into the cylinder.

By the fluid distributing assembly, according to the second aspect of the invention, it becomes possible, when contaminations is detected by the sensing element, that fluid from a reservoir, in particular a holding tank external to the design element forming a radome, will be delivered through a dispensing system to the surface of the radome and cleans it through one or more fluid exit elements, especially in form of spray nozzles. These nozzles can be located on the design element or external to the design element.

It is especially preferred that the contamination is automatically detected by a sensing element, especially incorporating a camera. Such a camera allows a detection of the contamination, especially rain and frost on the surface of the design element, which may reduce the radar performance. The use of a camera has furthermore the advantage depending on the location of the design element, especially rear or forward facing at the vehicle, that the camera can also provide a feed of images for other auxiliary functions. Such auxiliary functions might be line tracking, object detection, parking assistance and/or functioning as revising camera especially in case the design element is located on the rear of the vehicle.

It is especially preferred that the fluid exit elements and also the sensing element cannot be viewed when looking at the design element.

To reach that the sensing element and/or the spray nozzles are obscure from view, it is preferred that the fluid exit elements are located underneath a bezel of the design element. For the sensing element, especially two alternatives are possible to on the one hand not see the sensing element from the outside, but on the other hand allow a detection of contaminations.

In the first alternative, the sensing element is also located behind the bezel. The viewing angle or sensing angle of the sensing element is chosen so that a measurement is carried out perpendicular to a normal direction of a first surface of the design element checked for contamination. It is preferred that a sensing aperture in the bezel is at least semi-opaque to not allow a recognition of the sensing element behind the bezel. Such a sensing angle of the sensing element is especially suited for parking assistance cameras or rear reversing cameras on a rear facing design element.

It is also possible to avoid the aperture and to locate the sensing element behind the bezel in case the bezel is semi-transparent for the sensing radiation. For example a pvd coating could be located on a transparent resin such as a chrome plastic mirror coating on polycarbonate.

In a second alternative, the sensing element is placed on the backside of the design element and detects contamination by sensing along an angle being parallel to the normal direction of the surface of the design element. To avoid that the sensing element can be recognized from the outside, the sensing element is placed behind a coated section of the design element. A hole or transparent window in the rear overmold allows the sensing element, especially the camera, to view the first surface of the design element to detect contamination. The coating can be semi-transparent, i.e. transparent enough for the sensing element to "look" through and detect contamination. To avoid a negative influence onto the antenna, the sensing element is preferably placed outside the radiation field of the antenna to ensure that the sensing element does not disturb the radar function.

As coating for example, AlGe as a semi-transparent coating, allowing a transmission of 10%, might be used.

Once contamination is detected, the fluid is ejected at pressure from an array of exit elements, especially spray nozzles around the circumference of the design element.

The fluid is sprayed onto the first surface of the design element, acting as a radome to clean it. Also the spray nozzles can be housed in the bezel and can be hidden from the viewer. A spray nozzle manifold exists behind the bezel to deliver the fluid spray to the nozzles.

Of course, the light assembly according to the first aspect of the invention can be combined with the fluid distributing assembly according to the second aspect of the invention.

BRIEF DESCRIPTION OF DRAWINGS

Embodiments of the present invention will be discussed with reference to the accompanying drawings wherein.

In the following description, like reference characters designate like or corresponding parts throughout the figures.

DESCRIPTION OF EMBODIMENTS

Figure 1:
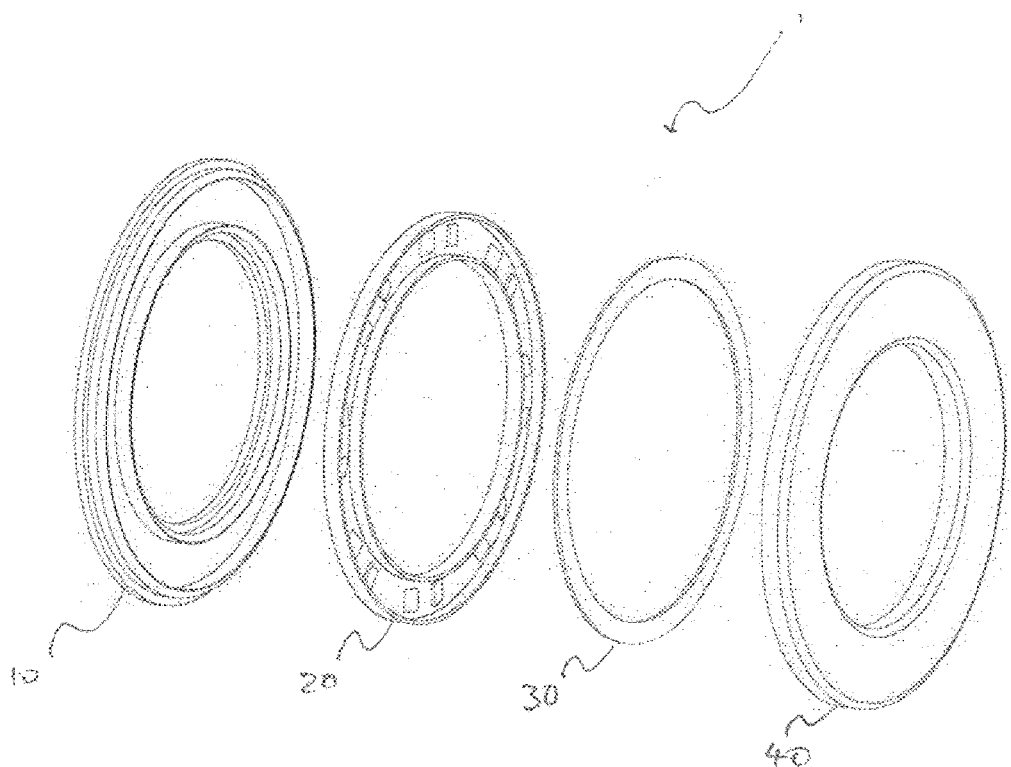
FIG. 1 is an exploded view of a vehicle design element including a light assembly according to an embodiment of the invention.

Referring now to FIG. 1, there is shown an exploded light assembly 1, which has a housing 10, a light guide 20, an annular printed circuit board (PCB) 30 featuring a plurality of light emitting diodes (LEDs, not shown), and a lens 40. The light assembly 1 provides light output such that a viewer would see a homogenous annular light output.

Figure 2:
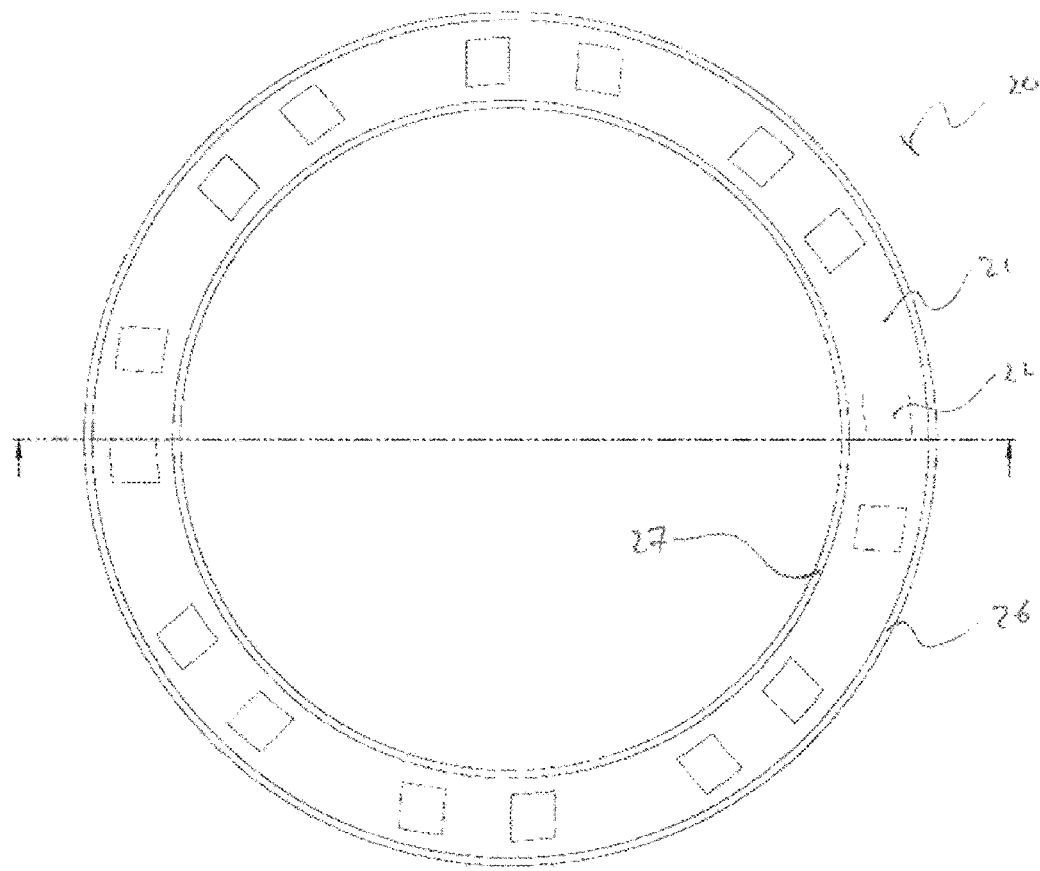
FIG. 2 is a plan view of an annular light guide with circumferential flanges and wedge shaped protrusions.
Figure 3:
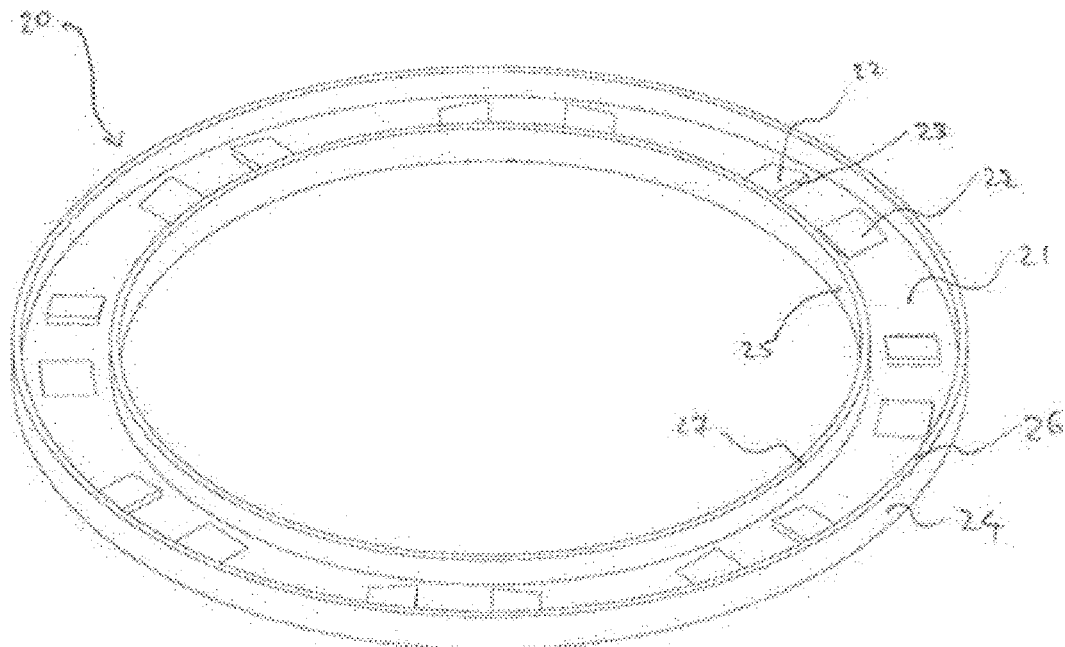
FIG. 3 is a perspective view of the annular light guide with circumferential flanges and wedge shaped protrusions.

Referring now to FIGS. 2 and 3 which show a plan and perspective view of the light guide 20, which has an annular base 21, on which there are a plurality of wedge shaped protrusions 22 which feature light receiving surfaces 23. The light guide further comprises an outer circumferential flange 24 and an inner circumferential flange 25, both of which extend away from the annular base 21 towards viewable outer and inner light exits 26 and 27, respectively.

Figure 2A:
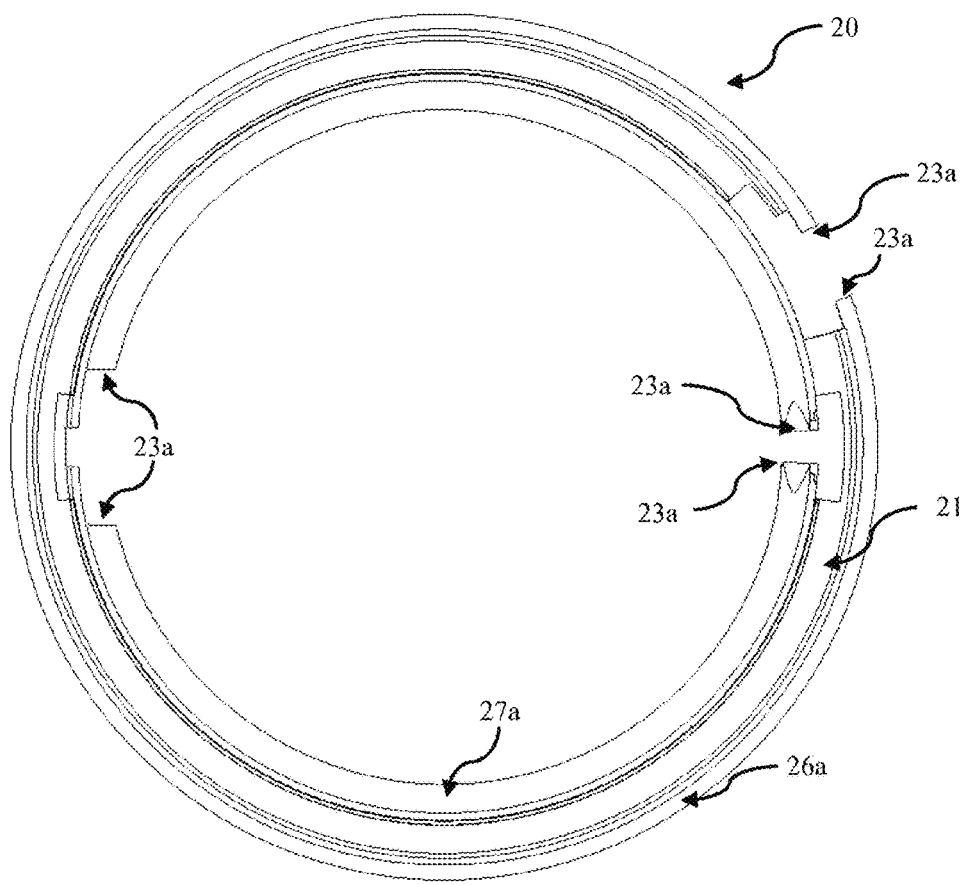
FIG. 2a is a plan view of an annular light guide with circumferential cylinders and light entry points at circumferential disconnections of the cylinder.
Figure 3A:
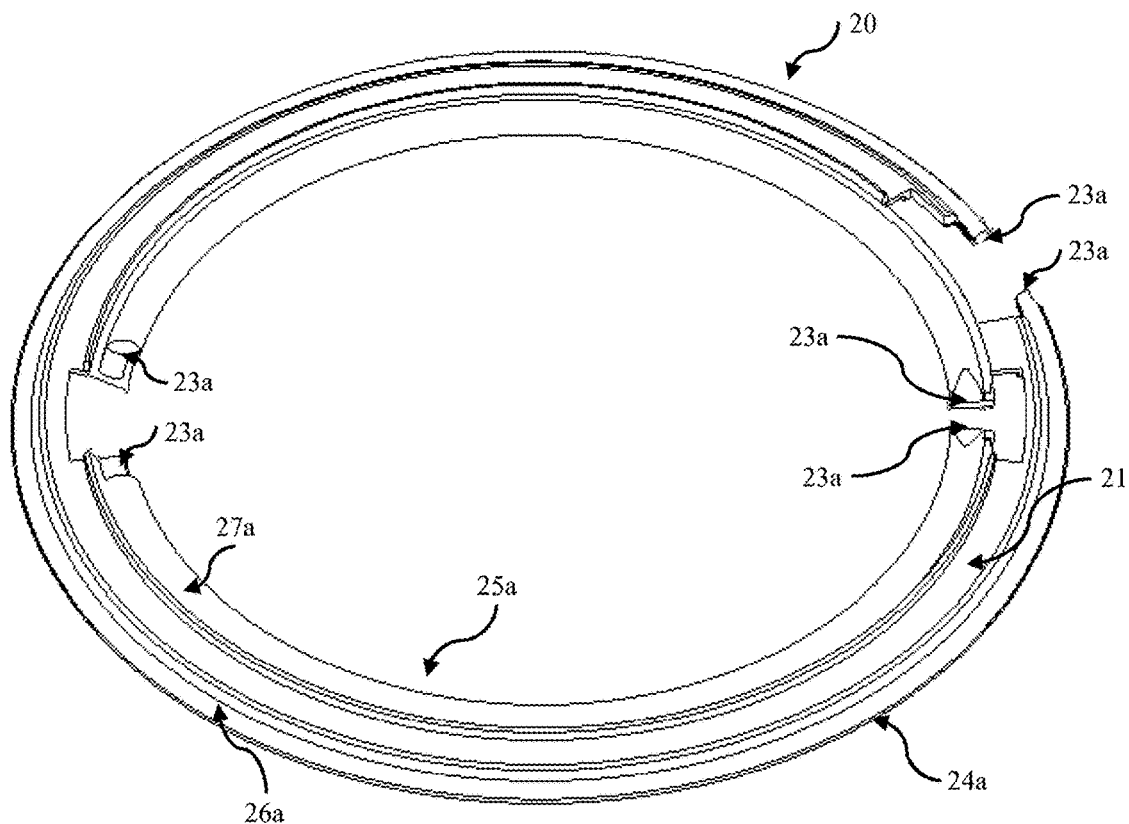
FIG. 3a is a perspective view of the annular light guide with circumferential cylinders and light entry points at circumferential disconnections of the cylinders.

Referring now to FIGS. 2a and 3a which show a plan and perspective view of the light guide 20, which has an annular base 21. On this annular base could be a plurality of wedge shaped protrusions which feature light receiving surface or light receiving surfaces, could exist at defined surface breakages around the circumferential flange 23a. The light guide further comprises an outer circumferential cylinder 24a and an inner circumferential cylinder 25a, both of which extend away from the annular base towards viewable outer and inner light exits 26a and 27a respectively.

Whilst the flanges 24, 25 appear perpendicular to the base 21, equally they could be splayed inwardly or outwardly without changing the functionality of the light guide 20. It can be seen that the light guide transitions from the base to the flanges sharply, the sharp transition facilitating internal reflection of light through the light guide. In the preferred embodiment, this transition would have a radius of less than 2% of the height of the flange, however it is appreciated that an alternative embodiment with a transition radius of less than 10% of the height of the flange would still produce desirable results.

In the case of the circumferential cylinders, these could be placed at different angles to the annular base, dependant on the position of final light output required and inner and outer cylinders can have various configurations of diameters.

The wedge shaped protrusions 22 are equally spaced around the base 21 in pairs, with each pair having their respective light receiving surfaces 23 adjacent one another, and wherein in use, each light receiving surface 23 is orientated substantially orthogonal to the base 21 and will receive light from one of the plurality of LEDs, which are positioned adjacent to said receiving surfaces 23.

Figure 4:
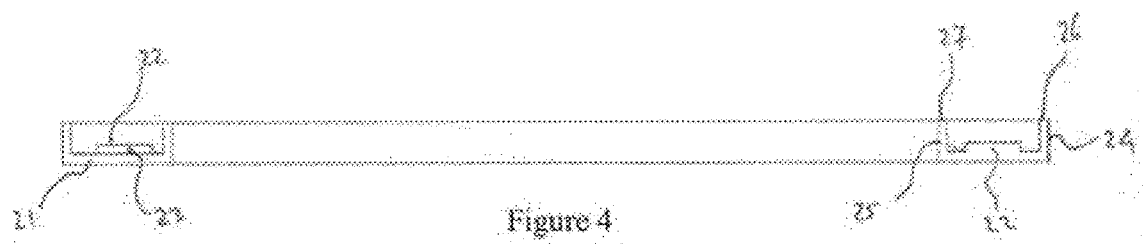
FIG. 4 is a cross-sectional view of the annular light guide with circumferential flanges and wedge shaped protrusions.

FIG. 4 shows how the outer and inner circumferential flanges 24 and 25, are configured such that they are orthogonal to the base 21. It can also be seen that, in this particular embodiment, the outer and inner light exits 26 and 27, are parallel to the base 21, thus also being orthogonal to the light receiving surfaces 23.

Figure 4A:
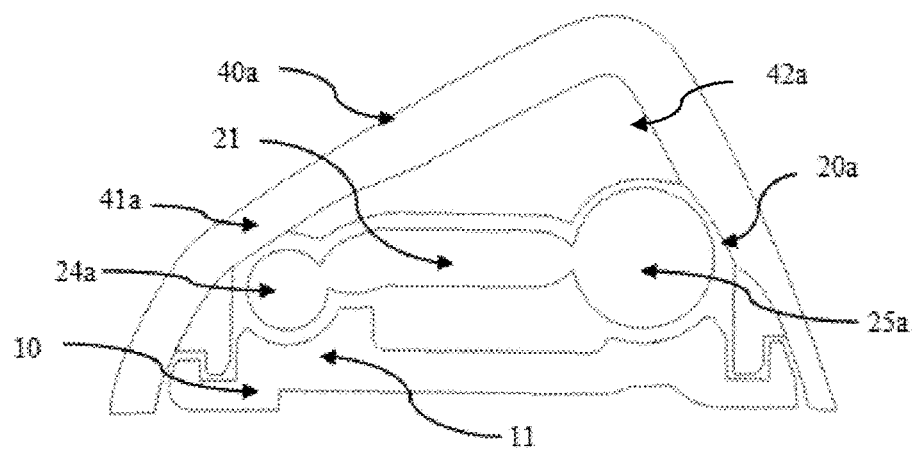
FIG. 4a is a cross sectional view of the light assembly with circumferential cylinders.

FIG. 4a shows how the outer and inner circumferential cylinders 24a and 25a are configured relative to the base 21. It can also be seen that, in this particular embodiment, the outer and inner light exits 26a, 27a can be at various segments around the diameter of the cylinder.

Figure 5:
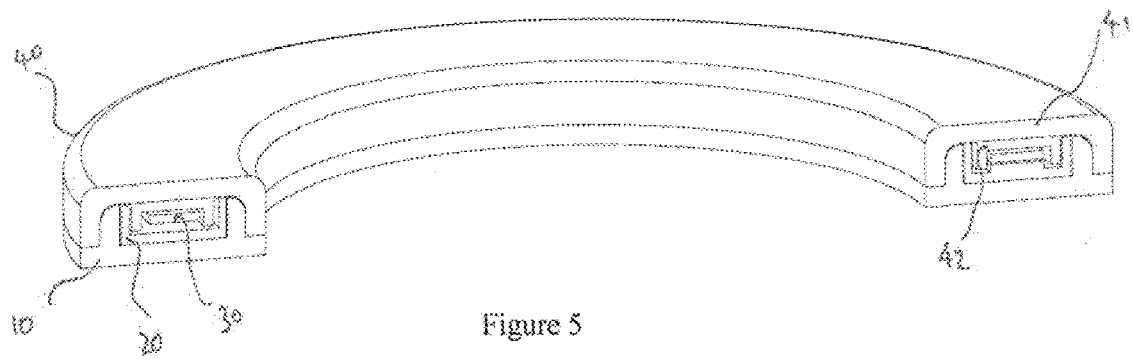
FIG. 5 is a cross-sectional view of the light assembly.

FIG. 5 shows a cross sectional view of the light assembly 1, showing how components of the light assembly 1 are assembled. The housing 10 forms the backing for the light assembly and may be manufactured from a black weather resistant plastic such as acrylonitrile styrene acrylate (ASA) or acrylonitrile butadiene styrene (ABS), or (PC) or polycarbonate blend and is configured to receive the light guide 20 which is mounted to the housing 10. The housing material optical properties can be selected to increase or decrease the final light output of the light assembly. A highly reflective material will increase the final light output level, a non-reflective material will reduce the final light output level of the light assembly. Transitional optic features on the housing 10 can be incorporated around the circumference of the cylinders to increase or decrease reflected light into the light guide, thereby creating a homogenous final light output of the light assembly. The PCB 30 is then mounted on the light guide 20. The PCB 30 may be coated white around the plurality of LEDs such that the light assembly 1 does not emit a green glow. The lens 40 is then connected or joined to the housing 10 (e.g. by welding) such that it sits over the PCB 30 and light guide 20.

The lens 40 is made of an outer component 41 and an inner component 42. The outer component 41 may be manufactured from a clear polycarbonate (PC) and the inner component 42 may be overmoulded on to the inner surface of the outer component 41, using opaque PC. The lens inner component 42 material optic properties can be selected to increase or decrease the reflected light back into the light guide 20. A highly reflective material will increase the final light output level, a non-reflective material will reduce the overall final light output level of the light assembly. The lens 40 is configured such that the outer or inner component 41 and 42 joins to the housing 10 and the inner component 42 sits over the top of the PCB 30 and wedge shaped protrusions 22 such that it masks the PCB, and LEDs from being directly viewable through the lens 40.

Figure 6:
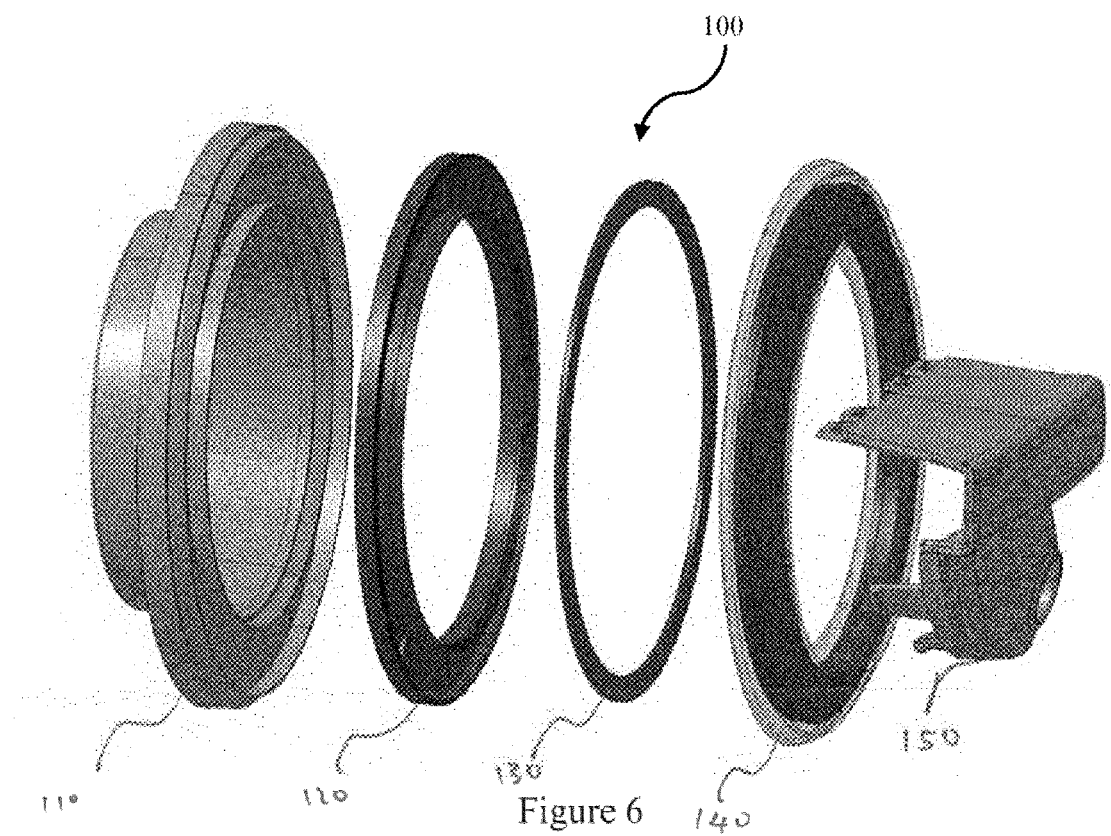
FIG. 6 is an exploded view of an automotive badge assembly according to another embodiment of the invention.
Figure 7:
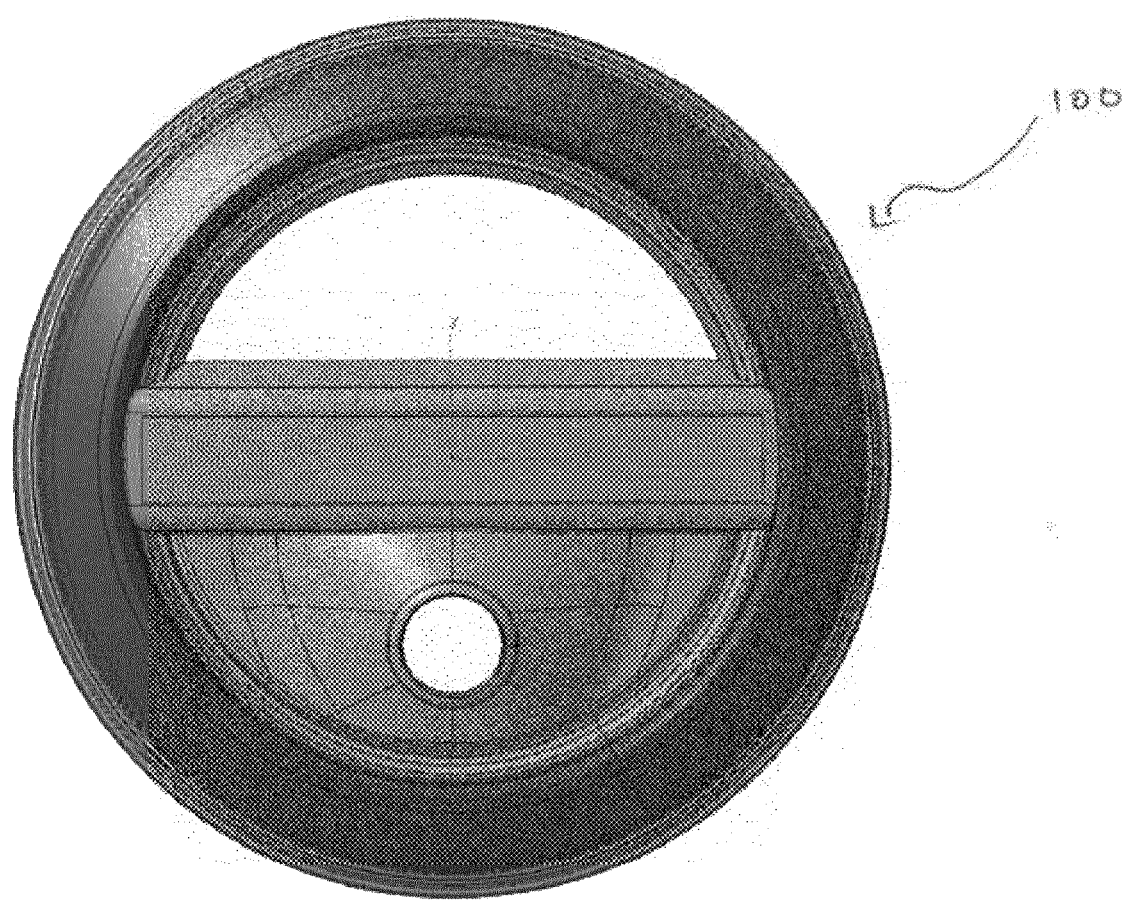
FIG. 7 is a plan view of the automotive badge assembly of FIG. 6.

Referring now to FIGS. 6 and 7 which show a light assembly as an alternative embodiment in the form of an automotive badge assembly 100. The badge 100 comprising a housing 110, a light guide 120, a PCB 130, a lens 140 and a garnish 150.

Figure 8:
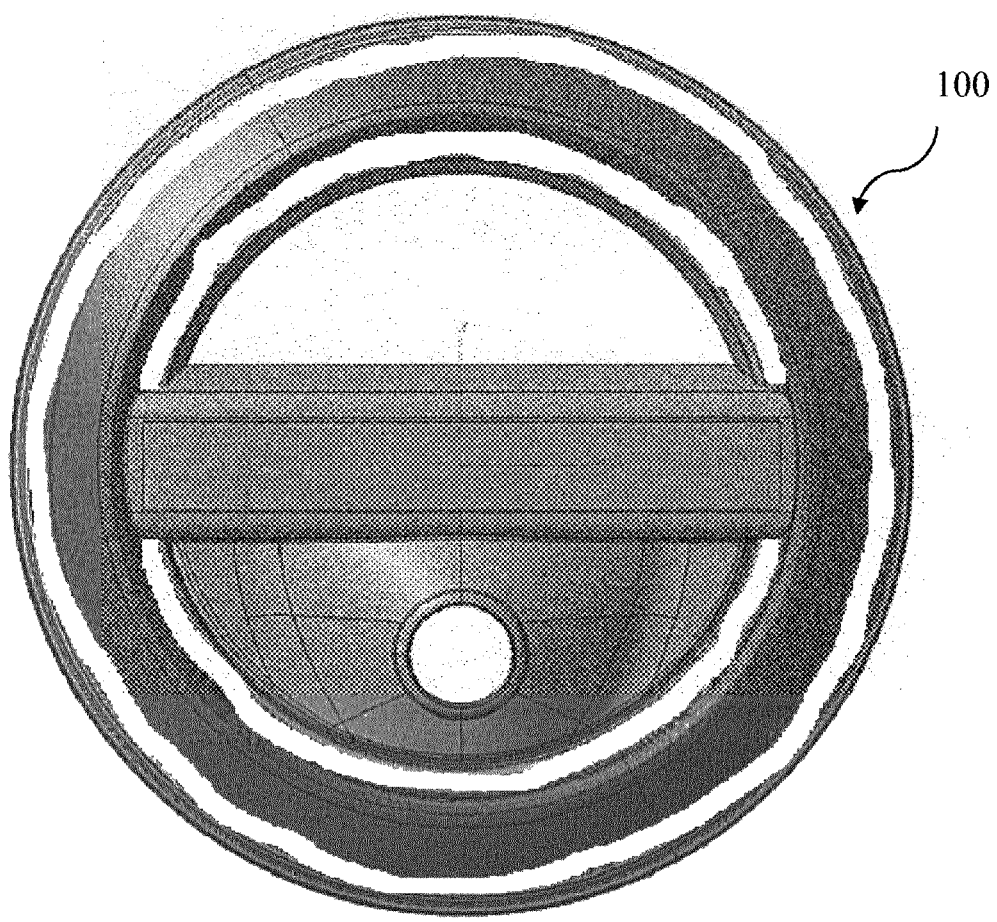
FIG. 8 is a plan view of the automotive badge assembly in an un-lit state.
Figure 9:
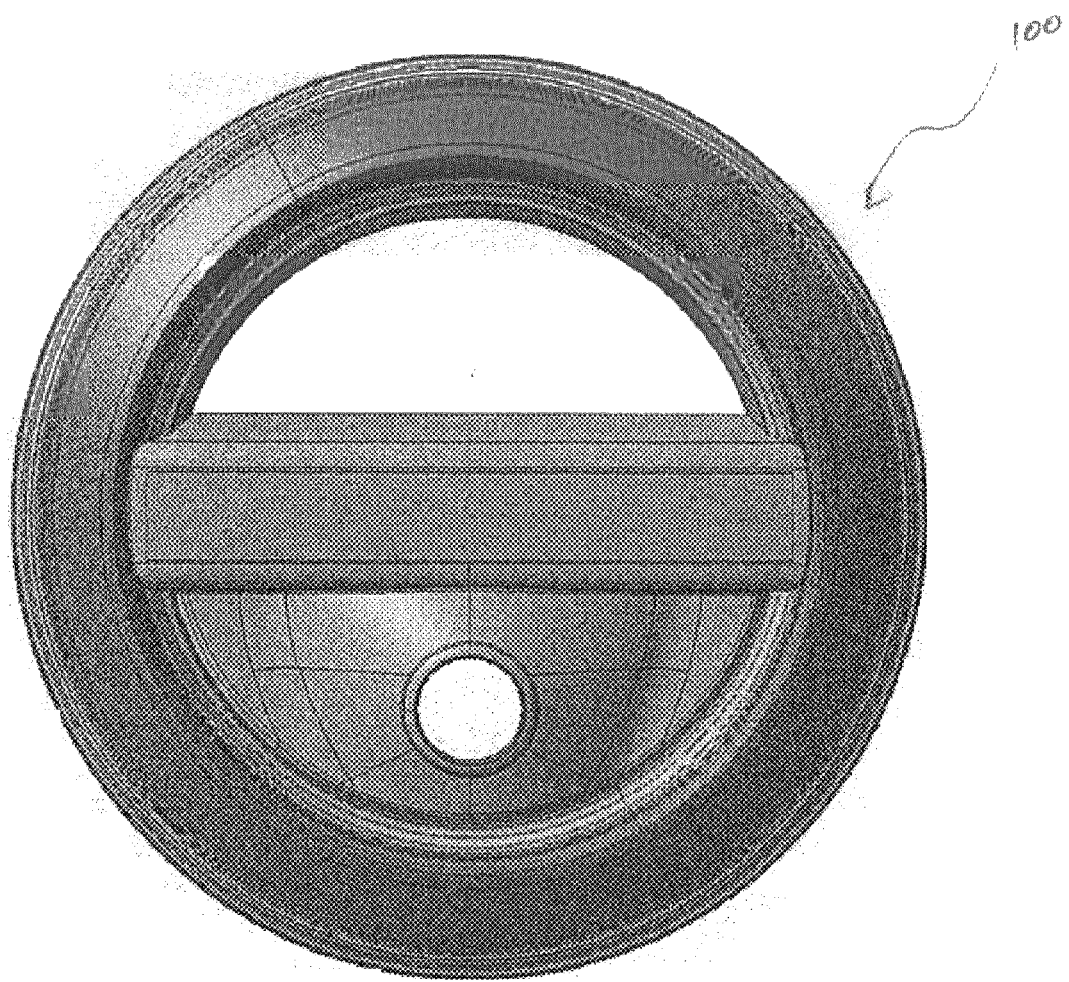
FIG. 9 is a plan view of the automotive badge assembly in a lit state.

FIGS. 8 and 9 show plan views of the badge assembly 100 in un-lit and lit states respectively. In FIG. 8, the light guide 120 is not visible and the lens 140 has a uniform chrome-like appearance. FIG. 9 shows that when the LED light sources are activated, the light guide 120 lights up and emits light through the lens 140 in a substantially uniform luminous intensity.

Figure 10:
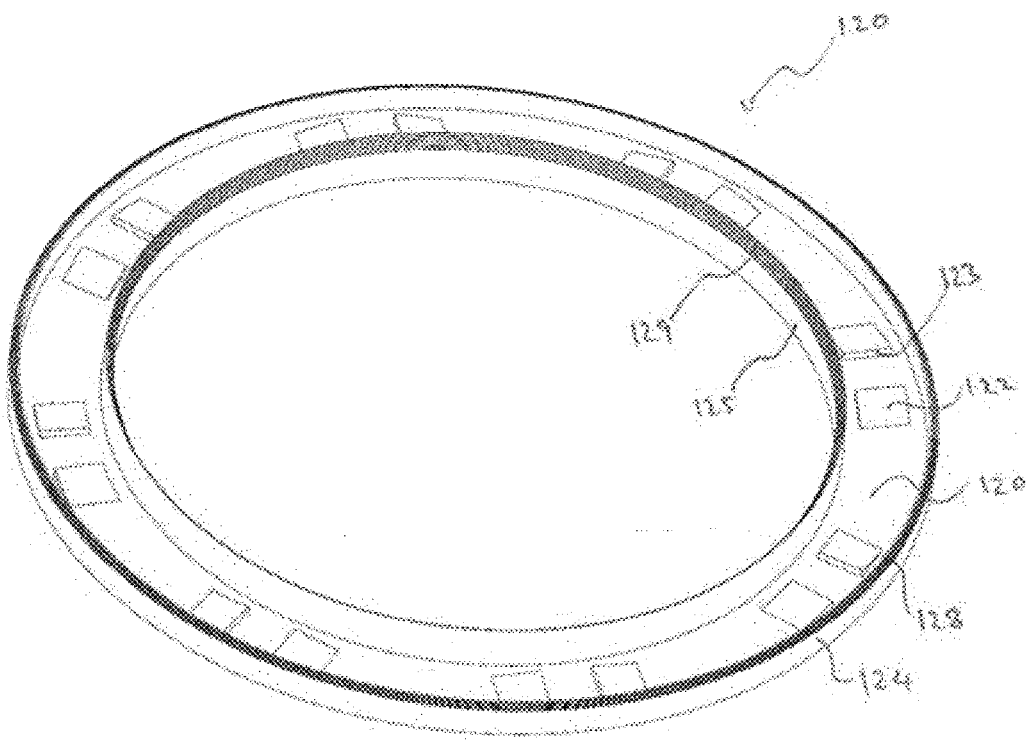
FIG. 10 is perspective view of a light guide with circumferential flanges.

Referring now to FIG. 10 which shows a perspective view of the light guide 120, which has a substantially annular base 121, on which there are a plurality of wedge shaped protrusions 122 which feature light receiving surfaces 123. The light guide further comprises a non-continuous outer circumferential flange 124 and non-continuous inner circumferential flange 125, both of which extend away from the base 121. The circumferential flanges further feature stepped light exits 126 and 127.

Figure 11:
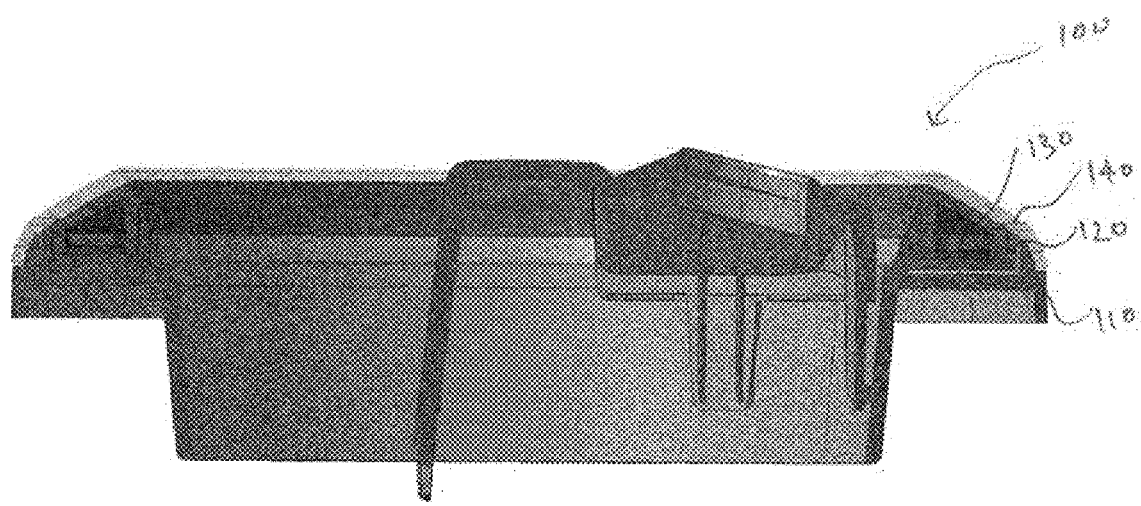
FIG. 11 is a cross-sectional view of the badge assembly of FIG. 6.

FIG. 11 shows a cross sectional view through the line A-A of the badge assembly 100 of FIG. 7. The configuration of the housing 110, light guide 120, PCB 130 and lens 140 of the badge assembly 100 is the same as that of the light assembly depicted in FIG. 5.

Figure 12:
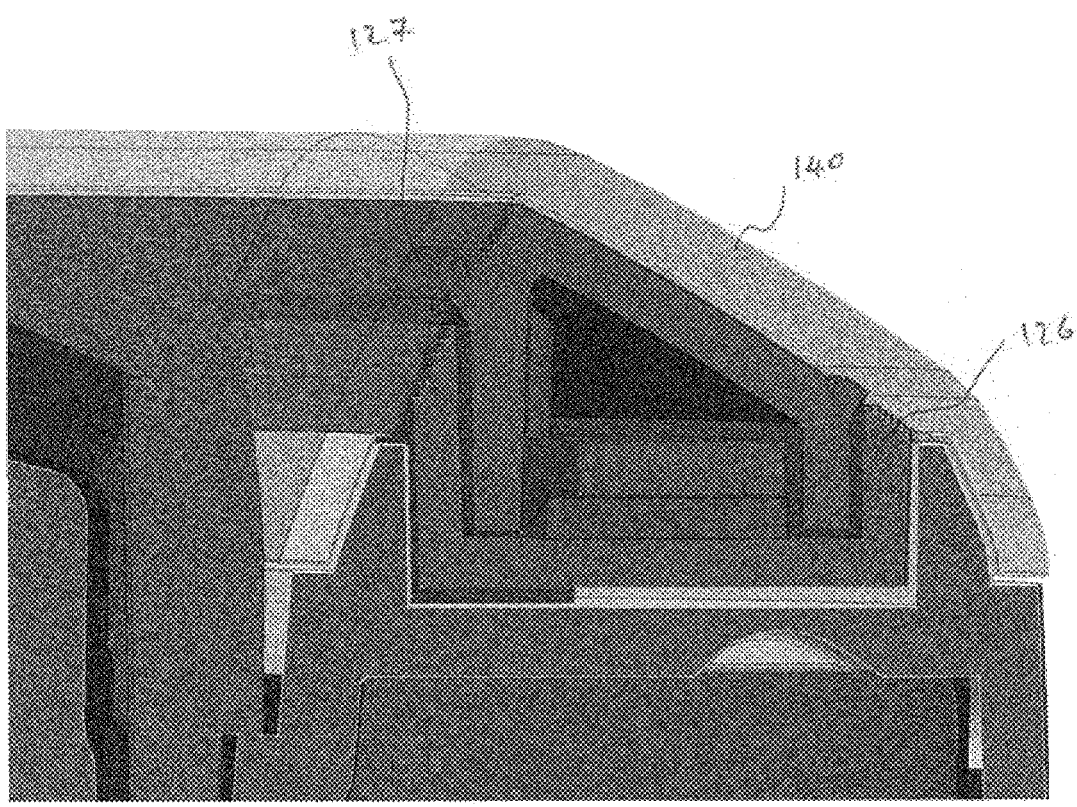
FIG. 12 is an enlarged cross-sectional view of the detail at I of FIG. 11 showing in more detail the construction of the automotive badge assembly.

Referring now to FIG. 12 which shows a detailed sectional view of the badge assembly 100 of FIG. 11. It is apparent in this view that the slope of the stepped light exits 126 and 127, of the light guide 120 are configured such that they follow the slope of the interior surface of the lens 140.

Figure 13:
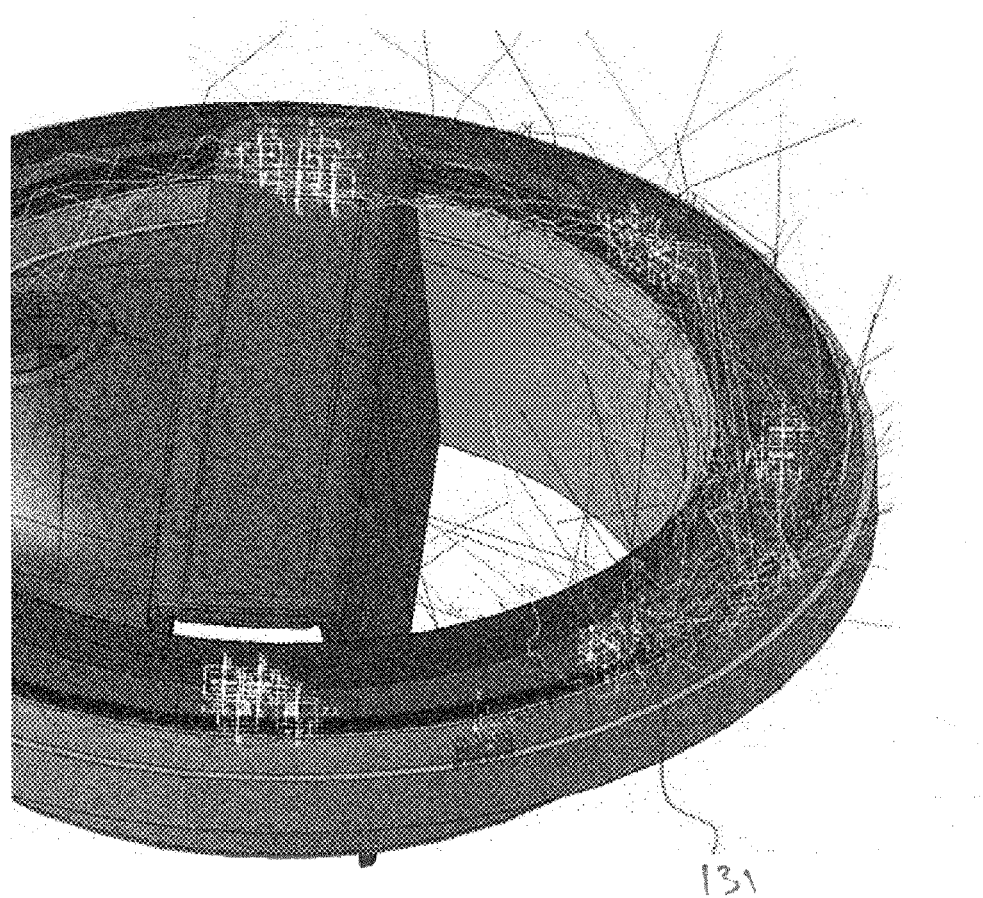
FIG. 13 is an isometric view of a schematic of the automotive badge assembly when in a lit state.
Figure 14:
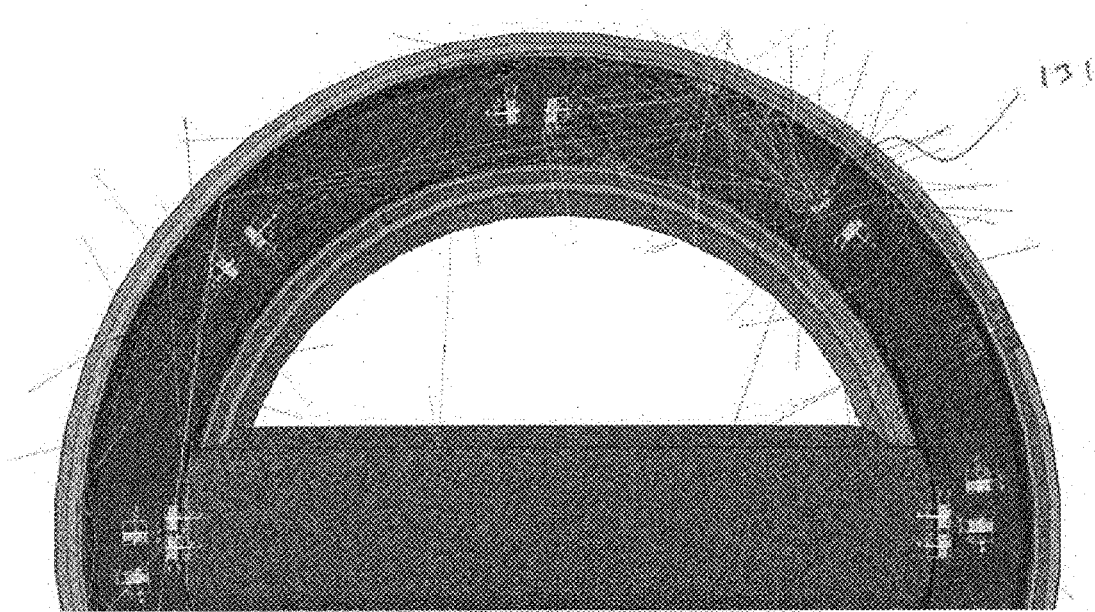
FIG. 14 is a plan view of a schematic of the automotive badge assembly when in a lit state.

FIGS. 13 and 14 show a schematic of the badge assembly of FIG. 7 when in a lit-state, illustrating how light rays behave when the light guide 120 is lit by a single LED light source 131, and the light rays enter the light guide 120 and are guided toward the stepped light exits 126 and 127. It can be seen that the light output is generally annular, however due to the non-continuous inner and outer circumferential flanges 124, 125, the light output is not continuous.

The light guide 120 is referred to as a particle filled lens to distinguish it from a crystal clear lens (or light guide) used in the manufacture of a traditional light guide. In a traditional light guide, light is transmitted from a light source to a point at some distance from the source with minimal loss by total internal reflection.

In this particle filled light guide 120, the transmission of light from the light source to the light exiting surfaces 126 and 127, is achieved through a combination of the use of internal reflection and light scattering particles. Internal reflection is encouraged through the geometry of the light guide 120, wherein light rays enter the light guide through the plurality of light receiving surfaces 123, and are guided through the wedge shaped protrusions 122 and into the base 121.

As can be seen in FIG. 14 in combination with FIG. 10, the orientation of the light receiving surfaces 123 with respect to the light guide 120 results in the light rays entering the light guide 120 approximately tangentially. The internal geometry of the light guide 120 encourages internal reflection with the incidence angle of the bulk of the light rays approaching the inner and outer walls of the outer and inner circumferential flanges 124 and 125, such that internal reflection is promoted, and the light rays will also reflect off the bottom surface of the base 121 such that they will travel up the inner and outer circumferential flanges 124 and 125, and exit through the outer and inner light exits 126 and 127.

As would be appreciated, the implementation of the stepped light exits 126 and 127, of this embodiment is for the purpose of promoting internal reflection within the light guide 120 when the light guide 120 is to sit below a sloped lens 140. Should the light guide 120 have instead featured a sloped light exit to match the lens 140, a large amount of light rays would have exited the light guide 120 at an undesirable location and/or angle.

Most light rays that enter the light guide 120 will encounter light scattering particles that alter the direction of the light rays. The effect of this light scattering is that light rays will spread throughout the light guide 120, further encouraging the light rays to exit through the light exiting surfaces 126 and 127 and also ensuring that an even distribution of light output occurs.

In the embodiment of the circumferential cylinder light guide 120 and light entry points at disconnected surfaces on the circumference of the cylinders, the annular base could be manufactured from non-diffusing clear material to promote total internal reflection and minimise losses through the annular base. The cylinders are then manufactured from particle filled, diffusing clear material to scatter the light and exit it through the light exit surfaces.

Figure 14A:
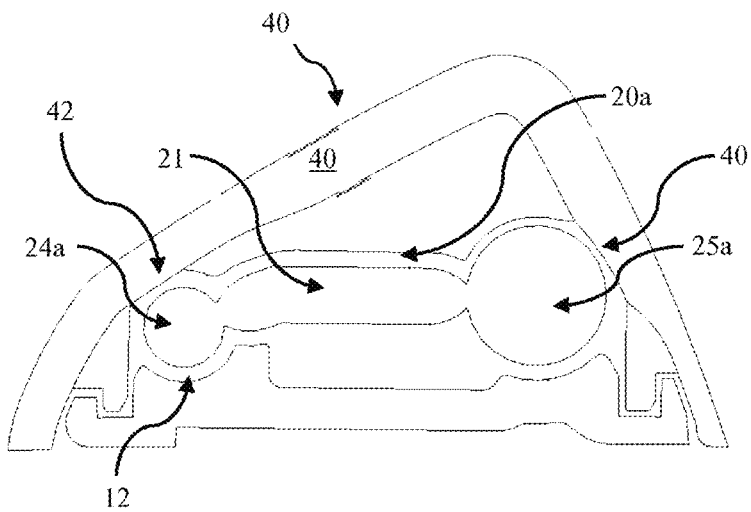

FIG. 14a shows a detailed section of the assembly with a light guide using circumferential cylinders. In the light guide of 20a internal reflection is encouraged through the geometry of the inner and outer cylinders, wherein light rays enter the light guide through the light receiving surfaces at disconnections around the circumference of the light guide 23a, and are guided around the circumference of the cylinders. Due to the particle filled nature of the cylinders 24a and 25a the light rays are altered in direction if they encounter a light scattering particle. An amount of light rays will exit through the light exiting surfaces at an angle and direction matching the light exit windows of the lens 40 and these will be visible to a viewer of the light assembly.

A proportion of light rays will scatter at an angle and direction that do not match the light exit windows of the lens 40. The efficiency of the light assembly can be increased by reflecting these light rays from the lens inner component material 41 or the housing material 10 back into the light guide 20a. These reflected light rays then have an opportunity to be scattered in a direction that does match the light exit windows of the lens.

Additionally, focusing optical geometry 12 can be included in the housing 10 to increase the amount of reflected light rays back into the light tubes. This geometry can be varied around the circumference of the light cylinders to improve the homogeneity of the overall light output of the light assembly.

The light scattering particles may be titanium dioxide particles of sufficient size and concentration such that the light guide appears transparent when un-lit while providing a substantially uniform luminous intensity surface output when lit.

Figure 15:
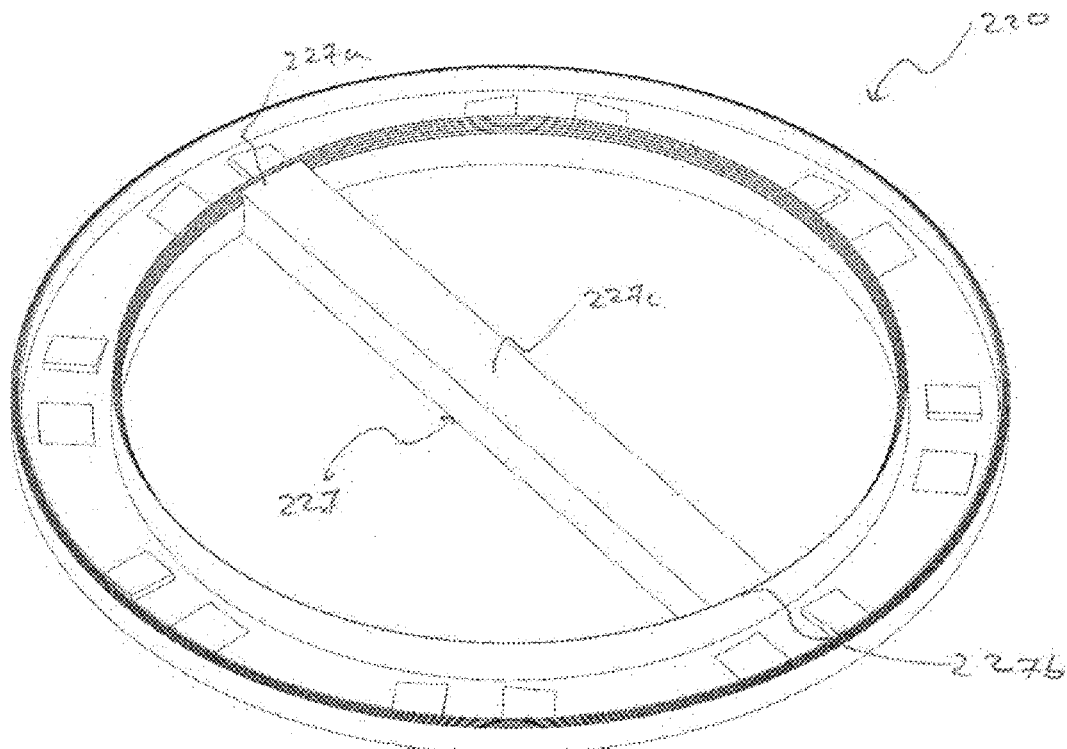
FIG. 15 is a perspective view of a light guide, according to an alternative embodiment.

FIG. 15 shows a perspective view of a light guide 220 according to an alternative embodiment, having the same features as the light guide 120. The light guide 220 also features a bridging member 227, manufactured from the same material as the light guide 220, which is located inside and bisects the substantially annular shape of the light guide 220. The bridging member 227 has a substantially trapezoidal cross-section and has first and second ends which are disposed as light receiving surfaces 227a, 227b, the bridging member 227 also featuring a light emitting surface 227c along its major surface.

In this embodiment, a PCB includes additional LEDs positioned adjacent to the light receiving surfaces 227a, 227b to direct light into the bridging member 227, wherein when lit, will provide a substantially uniform luminous intensity surface output. The bridging member 227 can be used in conjunction with the garnish (which covers the bridging member 227) to illuminate additional detail. For example, the garnish could feature cut-outs in the form of lettering or a logo, which would then be illuminated by the illuminated bridging member 227.

Figure 16:
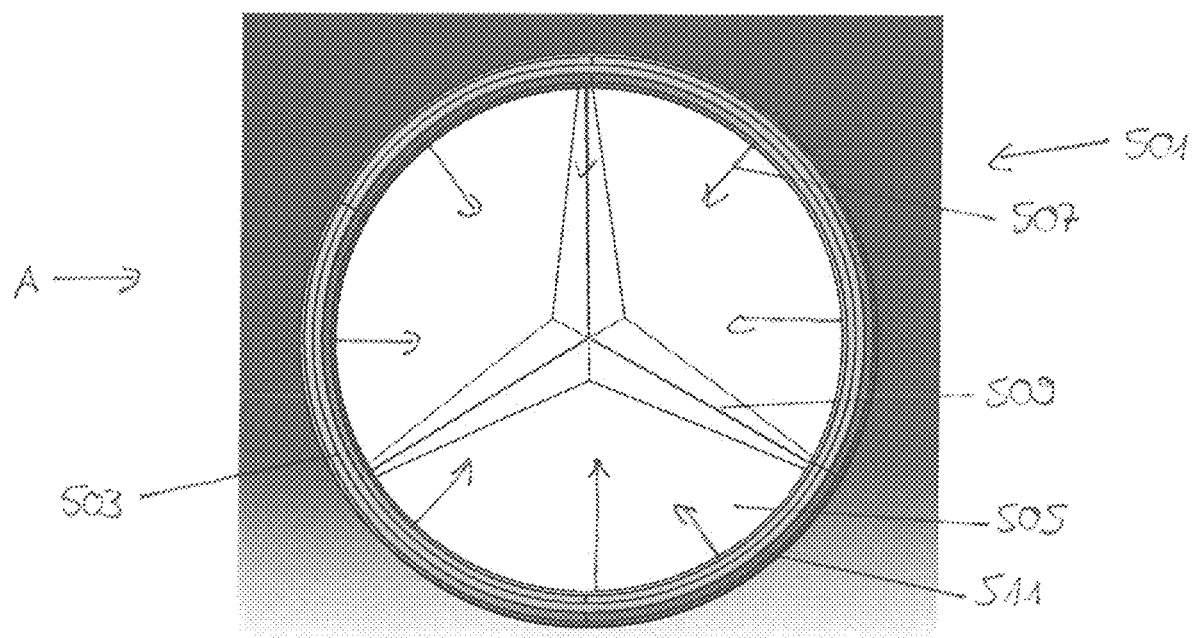
FIG. 16 is a perspective view onto a design element incorporating a fluid distributing assembly.

FIG. 16 shows a schematic view of a design element in form of a radome 501 incorporating a fluid distributing assembly 503. Via the fluid distributing assembly 503 it is possible to spray a cleaning fluid, in particular a cleaning liquid, on the first surface 505 of radome 501. Via not shown medium exit elements in form of spray nozzles, a respective cleaning fluid is sprayed in the directions represented by arrows 507 in FIG. 16. By using the cleaning fluid, any contaminations existing on the first surface 505 will be removed.

The first surface 505 furthermore comprises a design element in form of a logo 509. The logo 509 as well as the first surface visible in FIG. 1 represents a first area that is transmissible for electromagnetic radiation of the at least first frequency band that is transmitted and received by an antenna located behind the radome 1.

The first surface 5 and the logo 509 are however opaque and/or reflective for electromagnetic radiation in a second frequency band, especially visual light. In this way the antenna, located behind the radome 501, is not visible from the perspective shown in FIG. 16.

As can be seen in FIG. 16, the first surface 505 is surrounded by a bezel 511. To clean the first surface 505 from any contaminations, the cleaning fluid is ejected at pressure from the array of not shown spray nozzles around the circumference of the radome 501. The spray nozzles are housed within the bezel 511 and can be thus hidden from a viewer. Behind the ring bezel 511 furthermore a medium guide in form of a spray nozzle manifold is located to deliver the cleaning fluid to the spray nozzles.

Figure 17:
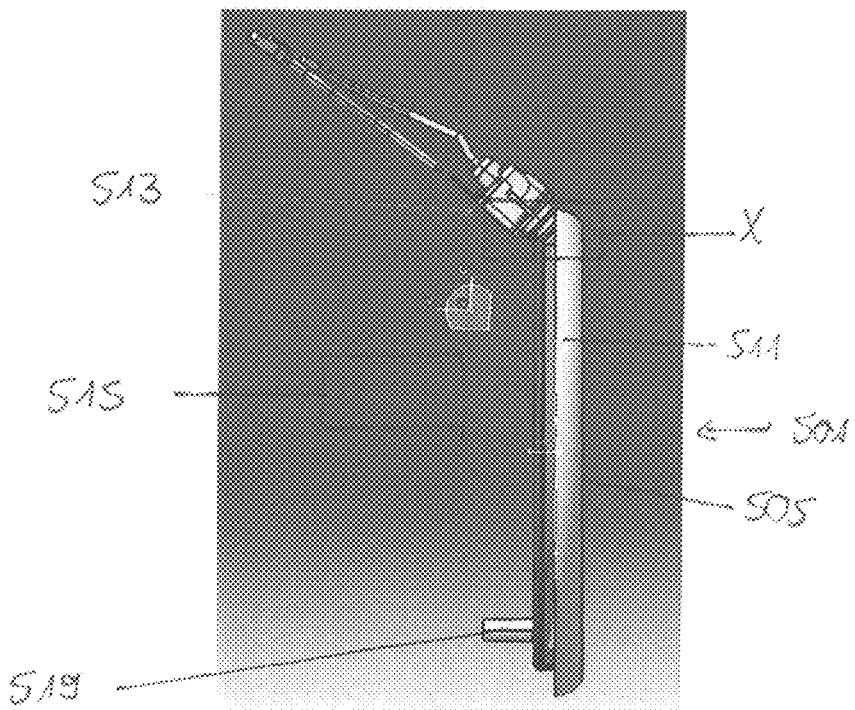
FIG. 17 is a perspective side-view in the direction A of FIG. 16 onto the fluid distributing assembly of FIG. 16 with a sensing element in form of a camera positioned at a first position.

In FIG. 17, a schematic side view of the radome 501 of FIG. 16 is shown. As can be seen in FIG. 17 behind the bezel 511, a sensing element in form of a camera 513 is located. The camera 513 is angled relative to the first surface 505 in such a way that contaminations on the first surface 505 can be viewed and detected.

To allow a detection of the surface 505 by a camera 513, a camera viewing aperture is provided within the bezel 511. This aperture is preferably placed on the underside of the bezel 511 to ensure that the camera remains obscure from view onto the first surface 505.

By using the camera 513 in the position shown in FIG. 17, the camera 513 can furthermore be used for other drive assistance systems like a parking assistant camera or a rear view camera in case the radome 501 is located on a rear facing side of a not shown vehicle.

As can be taken from FIG. 17, furthermore an antenna 515 is located relative to the camera 513 so that the camera 513 does not hinder the antenna 515 to transmit and receive electromagnetic radiation in the first frequency band through the radome 501, especially the first surface 505 and the logo 509. Furthermore, in FIG. 17, a connector 519 representing a medium receiving element is provided. The connector 519 can be connected to a not shown fluid reservoir in which the cleaning fluid is stored. The connector 519 allows to distribute the cleaning fluid via the spray nozzle manifold to the spray nozzles.

Figure 18:
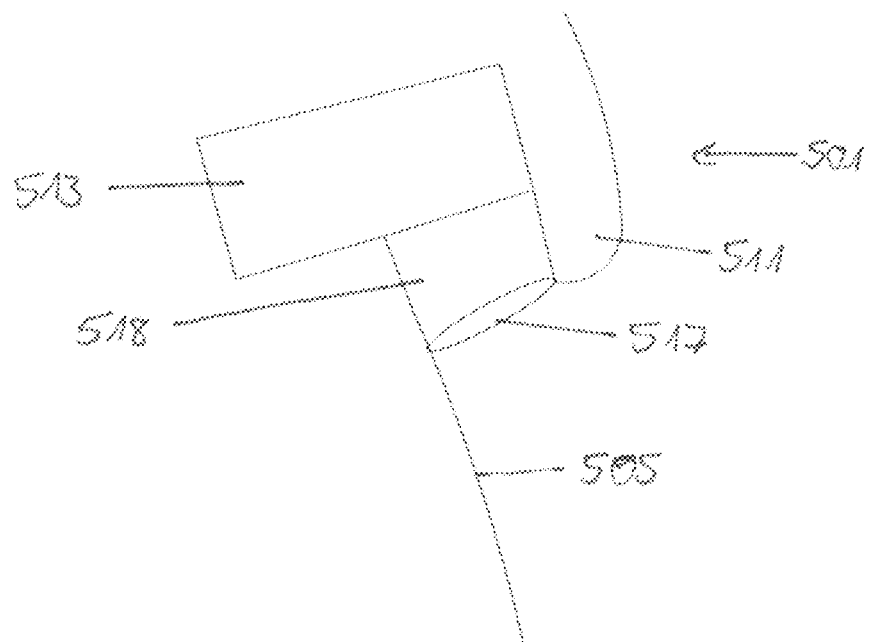
FIG. 18 is a schematic cut view of the detail X of the embodiment shown in FIG. 17.

In FIG. 18, a detailed view on the detailed X in FIG. 17 is shown. As can be seen, the camera 513 is located in such a way behind the bezel 511 that a view onto the surface 505 via the aperture 517 of a lense 518 of the camera 513 is possible.

Due to the viewing angle of the camera 513, the camera 513 can detect any impurities on the surface 505. Once impurities are detected by the camera, via a not shown control device and based on the signals of the camera 513, cleaning fluid is pumped via the connector 519 to the fluid nozzles so that the cleaning fluid is sprayed on the first surface 505 to clean it.

Figure 19:
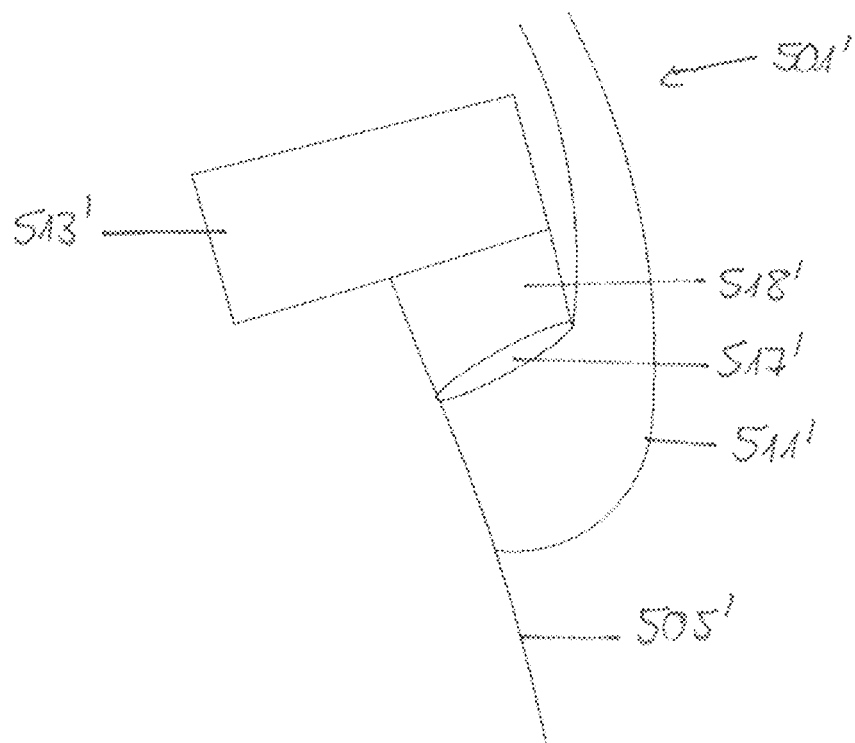
FIG. 19 is a schematic cut view according to detail X of an alternative embodiment.

In FIG. 19, a view of an alternative embodiment of the radome 501, similar to the detail shown in FIG. 18, is shown. The elements of the radome 501' that are similar to the elements of the radome 501, have the same reference signs however with one apostrophe. In contrast to the radome 501, the radome 501' comprises a bezel 511' that also covers the aperture 517' of the lense 518' of the camera 513'. In particular a lense 508' of the camera 513' is placed behind the bezel 511'. In this area, the bezel 511' is semitransparent, for at least part of the radiation sensed by camera 513' for example covered with a pvd-coating of a transparent resin comparable to a chrome plastic mirror coating on polycarbonate. Through the semitransparent coated bezel 511', the camera can view the first surface 505' through the bezel 511'.

Figure 20:
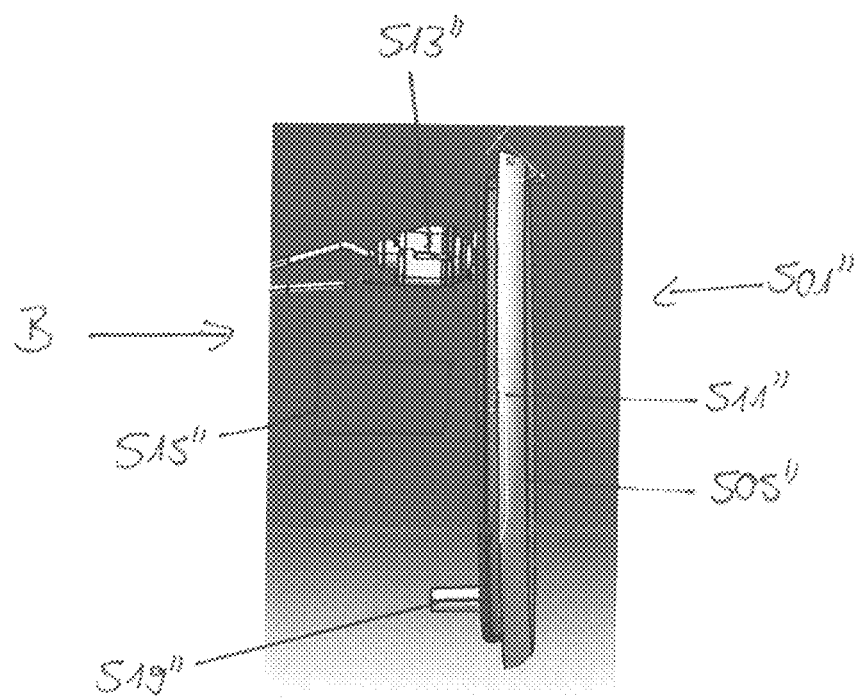
FIG. 20 is a perspective side-view onto an alternative embodiment of a fluid distributing assembly with a sensing element located at a different position.

In FIG. 20 an alternative embodiment of a radome 501" is shown. The elements of the radome 501" which correspond to the elements of radome 501, have the same reference signs, however with two apostrophes.

Figure 21:
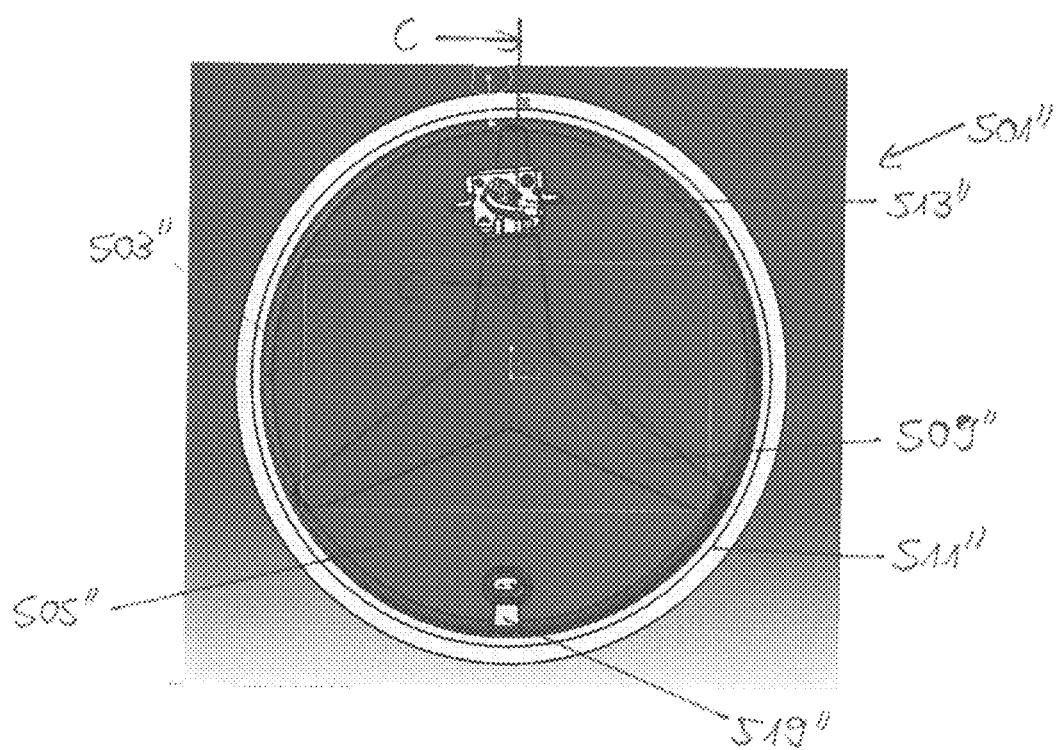
FIG. 21 is a view onto the assembly of FIG. 20 from a direction B in FIG. 20.

In FIG. 21 a view of the radome 501" from the direction B in FIG. 20 is shown. As can be seen from the FIGS. 20 and 21, the camera 513" is placed behind the first area 520" of the radome 501, being coated so that it is transparent for electromagnetic radiation emitted by the antenna 515" and being generally opaque for electromagnetic radiation of the second frequency band, especially visible light. However, the first surface 505" has a second area 521" in which the first surface is at least semitransparent for electromagnetic radiation of a third frequency band.

This third frequency band represents sensing radiation that is used by the camera 513" to detect any impurities on the surface 505". This area 521", allowing the camera 513" to look through the radome 501", might be realized in form of a hole or transparent window in a rear overmold of the radome 501" to allow the camera 513" to view the first surface 505".

The second area 521" might comprise a coating that is transparent enough for the camera 513" to look through and detect contaminations. Again, the camera 513" is placed just outside the receiving and emission field of the antenna 515" to ensure that it does not disturb the sending and receiving characteristics of the antenna 515".

Figure 22:
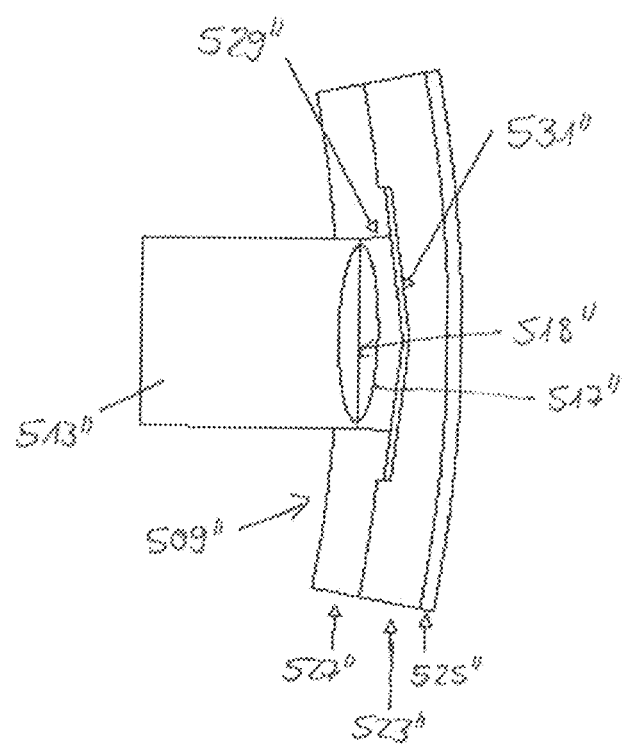
FIG. 22 is a perspective cut-view along the axis C in FIG. 21.

In FIG. 22, a schematic cross-section of the radome 501" of the FIGS. 20 and 21 is shown along the direction C in FIG. 21.

As can be seen from FIG. 22, the camera 513" is located in the area of the logo 509". Generally, the radome 501" comprises a substrate 523" that might be covered optionally by a protective hardcoat 525". On the side of the substrate 523" facing the antenna 515" and the camera 513", the substrate 523" is overmolded with an opaque and reflective overmold 527", representing a first coating, for example black IS, ABS or the like, to form logo 509". With this overmold 527", it is further secured that the radome 501" is opaque for visible light, however, is at least semitransparent for the electromagnetic radiation of the antenna 515".

Within the overmolding 527", the hole 529" is formed. Alternatively, a transparent window can be formed within the overmolding 527", for example polycarbonate or acrylic plug or mold. In the area of the hole 529", the backside of the substrate 523" is coated by a material 531" being transparent for the radiation of the antenna 515" and at least semi-transparent for sensing radiation of camera 513". Preferably the semi-transparency of material 531" is so that visual light falling onto the first surface 505" is mostly reflected, to form logo 509" however that the camera 13" can sufficiently receive signals to detect any impurities on the surface of the radome 501".

Thus in the embodiments shown in the FIGS. 20 to 22, the camera 513" is placed behind a coated section/area of the radome 501". The coating might be for example AlGe having a transparency of 10% to allow a look through for the camera 513".

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

For instance, the light output can either be completely annular, or partially annular, additionally, the light output does not have to be perfectly annular, the same homogenous light output could be achieved with a light guide shaped to define an elliptical annular, smooth square, or similar base with circumferential flanges. The circumferential flanges may describe a complete circumference or alternatively maybe non-continuous describing a part circumference.

Please note that the following claims are provisional claims only, and are provided as examples of possible claims and are not intended to limit the scope of what may be claimed in any future patent applications based on the present application. Integers may be added to or omitted from the example claims at a later date so as to further define or re-define the invention.

REFERENCE SIGNS 1 light assembly
10 housing
12 focusing optical geometry
20, 20a light guide
21 annular base
22 protrusions
23, 23a light receiving surfaces
24 outer circumferencial flange
24a outer circumferencial cylinder
25 inner circumferencial flange
25a inner circumferencial cylinder
26, 26a outer light exits
27, 27a inner light exists
30 printed circuit board
40, 40a lens
41, 41a outer component
42, 42a inner component
100 badge assembly
110 housing
120 light guide
121 annular base
122 protrusions
123 light receiving surfaces
124 non-continuous outer circumferencial flange
125 non-continuous inner circumferencial flange
126 stepped outer light exits
127 stepped inner light exists
130 printed circuit board
131 LED light source
140 lens
150 garnish
220 light guide
227 bridging member
227a, 227b light receiving surfaces
227c light emitting surface
501, 501', 501" radome
503, 503" fluid distributing assembly
505, 505', 505" surface
507 direction
509, 509" logo
511, 511', 511" bezel
513, 513', 513" camera
515, 515" antenna
517, 517', 517" aperture
518, 518', 518" lense
519, 519" connector
520" area
521" area
523" substrate
525" hardcoat
527" overmolding
529" hole
531" material
A, B, C direction
X detail

What is claimed is:

1. A medium distributing assembly for a vehicle design element, the assembly comprising:
   a medium guide comprising:
      at least one medium receiving element; and
      at least one medium exit element,
   wherein the medium is a fluid which comprises at least one of a heated fluid and a cleaning fluid,
   wherein the medium exit element has at least partly an annular form, and comprises at least one nozzle to direct fluid onto at least one first surface of the design element, and
   wherein at least one of:
      the at least one first surface of the design element is adverted to at least one of an antenna emitting and sensing electromagnetic radiation in at least one first frequency band, and
      the medium distributing assembly further comprises at least one sensing element for detecting of contaminations on the first surface.

2. The assembly of claim 1, wherein the assembly is a light assembly, the medium is light and the medium guide is a light guide, wherein the light guide includes a plurality of light receiving surfaces; and
- a plurality of light sources, preferably in form of light emitting diodes (LEDs) on a circuit board, the light sources being arranged adjacent to and directed towards respective light receiving surfaces; characterized in that
- the light guide is shaped to define an annular base lying in a first plane and at least one circumferential flange or cylinder disposed generally orthogonal, or inwardly or outwardly splayed to the first plane, the flange or cylinder extending away from the annular base towards a viewable annular light exit,
- the base including a plurality of shaped elements, in particular in form of disconnections, recesses, holes or wedge-shaped protrusions, extending away from the first plane, each shaped element defining one of the light receiving surfaces for receiving incident light from a respective adjacent light source, wherein a plurality of the light receiving surfaces are orientated substantially transverse to the base.

3. The assembly of claim 2, wherein the light guide transitions from the base to the flange or cylinder, sharply with a radius of less than 10% of a height of the flange or cylinder, the sharp transition facilitating internal reflection of light emitted from the light sources.

4. The assembly of claim 2, wherein the light guide is shaped to include two spaced-apart circumferential flanges, each flange extending away from the annular base towards a viewable annular light exit, the two viewable annular light exits radially spaced apart from each other.

5. The assembly of claim 2, wherein the light guide is shaped to include two spaced apart circumferential cylinders, each cylinder extending away from the annular base towards a viewable annular light exit, the two viewable light exits radially spaced apart from each other.

6. The assembly of claim 2, wherein the circumferential flanges or cylinders are non-continuous to provide disconnections such that circumferential light entry points at disconnected surfaces on the circumference of the flanges or cylinders are provided.

7. The assembly of claim 2, wherein the annular light exit includes a plurality of steps, the steps promoting internal reflection.

8. The assembly of claim 2, wherein the light guide is substantially transparent and without any visible discrete optic features in an un-lit state, while being diffusive in a lit state.

9. The assembly of claim 2, wherein the light guide is substantially transparent and non-diffusive in both a lit and un-lit state, while the circumferential flanges or cylinders are substantially transparent in an un-lit state, while being diffusive in a lit state.

10. The assembly of claim 2, wherein a housing is provided behind the light guide, which preferably incorporates transitional reflective optics that vary the amount of light reflected back into the circumferential flanges or cylinders and/or comprises a black material.

11. The assembly of claim 2, wherein the light guide also features a bridging member, manufactured from the same material as the light guide, which is located inside and bisects the substantially annular shape of the light guide, and the bridging member has first and second ends which are disposed as light receiving surfaces and a light emitting surface along its major surface.

12. The assembly of claim 11, wherein the bridging member has a substantially trapezoidal cross-section.

13. The assembly of claim 2, wherein the printed circuit board has an annular shape and/or is coated white around the plurality of LEDs.

14. The assembly of claim 12, wherein a printed circuit board includes additional light sources positioned adjacent to the light receiving surfaces to direct light into the bridging member.

15. The assembly of claim 11, wherein the bridging member is used in conjunction with a garnish, the garnish preferably comprising cut-outs in the form of lettering or a logo.

16. The assembly of claim 2, wherein the lens has an outer component, preferably made from a clear material, and an inner component, preferably over moulded on the inner surface of the outer component and/or made from opaque material.

17. The assembly of claim 16, wherein
- the inner or outer component joins to the housing and/or
- the inner component sits on top of the printed circuit board and the shaped elements.

18. The assembly of claim 1, wherein the medium receiving element is one or more of connected to at least one fluid reservoir including at least one holding tank or at least partly stores the medium.

19. The assembly of claim 1, wherein the antenna comprises at least one radar antenna or the first frequency band comprises at least one radar frequency ranging from 10 MHz to 130 GHz.

20. The assembly of claim 1, wherein the design element is at least partially transmissible for electromagnetic radiation and comprises at least one first area being transmissible for electromagnetic radiation of at least the first frequency band, and being reflective, semitransparent and/or opaque for electromagnetic radiation falling onto the first surface and having a frequency within at least one second frequency band, wherein the second frequency band preferably comprises 384 THz to 789 THz and/or visual light.

21. The assembly of claim 1, wherein the sensing element comprises at least one optical sensor, at least one ultrasonic sensor, at least on a camera, at least one capacitive sensor, at least one magnetic sensor, at least one electromagnetic sensor and/or at least one conductibility sensor.

22. The assembly of claim 1, wherein the assembly comprises at least one control element for controlling and/or regulating a flow of the medium into the medium receiving element, through the medium guide and/or out of the exit element based on signals of the sensing element.

23. The assembly of claim 1, wherein the sensing element is at least indirectly in communication with the control element and/or at least one drive assistance system of the vehicles including a lane holding assistant, an object detection assistant, a parking assistant and/or a rear viewing assistant.

24. The assembly of claim 1, wherein the sensing element is sensing contaminations of the first surface in a direction being mainly parallel to a normal direction of the first surface.

25. The assembly of claim 1, wherein the sensing element is at least partly located in the first area on the side of the design element facing the antenna, wherein the first area is semitransparent and/or transmissible for third radiation, electromagnetic radiation within a third frequency band, detected by the sensing element and/or comprises at least one second area being semitransparent and/or transmissible for the third radiation.

26. The assembly of claim 25, wherein the design element comprises at least one substrate being transmissible for electromagnetic radiation and at least one first coating covering the substrate in the first area, the first coating being transmissible for electromagnetic radiation of the first frequency band and semitransparent, reflective and/or opaque for electromagnetic radiation having a frequency the second frequency band.

27. The assembly of claim 26, wherein the second area is free of the first coating and/or comprises at least one second coating covering the substrate in the second area and being semitransparent and/or transmissible for the third radiation.

28. The assembly of claim 1, wherein the sensing element is sensing contaminations of the first surface in a direction being mainly perpendicular to a normal direction of the first surface and/or parallel to the first surface.

29. The assembly of claim 1, wherein the medium guide, the medium receiving element, the medium exit element and/or the sensing element is/are at least partly located behind at least one bezel of the design element.

30. The assembly of claim 29, wherein the bezel is at least partly opaque for the first radiation and/or second radiation and/or transparent and/or semitransparent for the third radiation.

31. A vehicle design element which is at least one including or connected to at least one light distributing assembly,
wherein the light distributing assembly comprises a light guide comprising at least one light receiving element and at least one light exit element, wherein the light exit element has at least partly an annular form,
wherein the light guide includes a plurality of light receiving surfaces; and
wherein a plurality of light sources are arranged adjacent to and directed towards respective light receiving surfaces;
wherein the light guide is shaped to define an annular base lying in a first plane and at least one circumferential flange or cylinder disposed generally orthogonal, or inwardly at outwardly splayed to the first plane, the flange or cylinder extending away from the annular base towards a viewable annular light exit,
wherein the base includes a plurality of shaped elements, in particular in form of disconnections, recesses, holes or wedge-shaped protrusion, extending away from the first plane, each shaped element defining of the light receiving surfaces for receiving incident light from at respective adjacent light source, wherein a plurality of the light receiving surfaces are orientated substantially transverse to the base, and
wherein the vehicle design element is comprised at least partly by at least one radome and/on forms at least partly at least one radome.

32. The element of claim 31, wherein the medium exit element is at least partly located on a side of the radome being located opposite the antenna.

33. The element of claim 31, wherein the element comprises at least one first medium distributing assembly and at least one second medium distributing assembly, wherein preferably the first medium distributing assembly and the second medium distributing assembly are at least partly integrally formed.

34. A medium distributing assembly for a vehicle design element, wherein the medium is a fluid, which comprises at least one of a heated fluid and a cleaning fluid, and the assembly comprises:
a medium guide comprising:
at least one medium receiving element;
at least one medium exit element;
at least one sensing element for detection of contaminations on a first surface of the of the design element; and
at least one control element for controlling and/or regulating a flow of the medium at least one of into the medium receiving element, through the medium guide and out of the exit element, based on signals of the sensing element.

35. A medium distributing assembly for a vehicle design element, wherein the medium is a fluid, which comprises at least one of a heated fluid and a cleaning fluid, and the assembly comprises:
a medium guide comprising:
at least one medium receiving element;
at least one medium exit element; and
at least one sensing element for detection of contaminations on a first surface of the of the design element,
wherein at least one of the medium guide, the medium receiving element, the medium exit element and the sensing element is at least partly located behind at least one bezel of the design element.

* * * * *